US012640517B2

(12) United States Patent
Yang et al.

(10) Patent No.: US 12,640,517 B2
(45) Date of Patent: May 26, 2026

(54) ROBUST CARD EDGE CONNECTOR

(71) Applicant: Amphenol Commercial Products (Chengdu) Co., Ltd., Chengdu (CN)

(72) Inventors: Kui Yang, Chengdu (CN); Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 398 days.

(21) Appl. No.: 18/346,150

(22) Filed: Jun. 30, 2023

(65) Prior Publication Data

US 2024/0014596 A1 Jan. 11, 2024

(30) Foreign Application Priority Data

Jul. 6, 2022 (CN) ......................... 202221747907.0

(51) Int. Cl.
*H01R 13/627* (2006.01)
*H01R 12/72* (2011.01)

(52) U.S. Cl.
CPC ....... *H01R 13/6275* (2013.01); *H01R 12/721* (2013.01)

(58) Field of Classification Search
CPC .... H01R 13/6275; H01R 12/721; H01R 4/02; H01R 12/737; H01R 13/639
USPC .......................................................... 439/329
See application file for complete search history.

(56) References Cited

U.S. PATENT DOCUMENTS 7,607,949 B2 10/2009 Hsu
7,637,783 B2 12/2009 Sasaoka et al.
7,677,907 B2 3/2010 Guan et al.
7,731,541 B1 6/2010 Lee et al.
7,892,006 B2 2/2011 Guan et al.
7,972,171 B2 7/2011 The
(Continued)

FOREIGN PATENT DOCUMENTS

CN 202633554 U 12/2012
CN 203660106 U 6/2014
(Continued)

OTHER PUBLICATIONS

U.S. Appl. No. 17/540,062, filed Dec. 1, 2021, Liu et al.
(Continued)

*Primary Examiner* — Abdullah A Riyami
*Assistant Examiner* — Amara Anderson
(74) *Attorney, Agent, or Firm* — Wolf, Greenfield & Sacks, P.C.

(57) ABSTRACT

A card edge connector that is robust under various operating conditions of a system in which the connector is used. The connector has a housing holding terminals. The housing has a slot extending from a body to a tower disposed at an end of the body. The tower has an outer chamber and an inner chamber joining the out chamber and the slot. The outer and inner chambers comprising joined side walls. The side walls of the inner chamber are thicker than that of the outer chamber. A latch is pivotably disposed in the tower between a locked position and an unlocked position for retaining and releasing an electronic card inserted in the slot. The latch has a body and protrusions protruding from the body toward the slot. The latch body engages the side walls of the outer chamber. The protrusions engage the side walls of the inner chamber.

20 Claims, 15 Drawing Sheets

(56) References Cited

U.S. PATENT DOCUMENTS

| | | | | |
|---|---|---|---|---|
| 8,142,207 | B1 | 3/2012 | Ljubijankic et al. | |
| 8,187,031 | B2 | 5/2012 | Li et al. | |
| 8,403,689 | B2 | 3/2013 | Li et al. | |
| 8,535,077 | B2 | 9/2013 | Shen et al. | |
| 8,721,350 | B2 | 5/2014 | Liu et al. | |
| 9,166,317 | B2 | 10/2015 | Briant et al. | |
| 9,325,090 | B2 * | 4/2016 | Shen | H01R 12/721 |
| 9,431,734 | B2 | 8/2016 | Guo et al. | |
| 9,685,723 | B2 | 6/2017 | Kee Mew | |
| 9,887,485 | B2 | 2/2018 | Lambie et al. | |
| 10,103,476 | B1 | 10/2018 | Qiu et al. | |
| 10,135,165 | B2 | 11/2018 | Zuo | |
| 10,224,653 | B2 | 3/2019 | Niu et al. | |
| 10,461,467 | B2 * | 10/2019 | Eppley | H01R 12/721 |
| 10,741,944 | B2 | 8/2020 | Long | |
| 10,855,020 | B1 | 12/2020 | Phillips et al. | |
| 10,916,894 | B2 | 2/2021 | Kirk et al. | |
| 11,374,340 | B2 | 6/2022 | Tang | |
| 11,545,769 | B2 | 1/2023 | Comerci et al. | |
| 11,637,391 | B2 | 4/2023 | Guo et al. | |
| 11,710,923 | B2 | 7/2023 | Hu et al. | |
| 2007/0032117 | A1 * | 2/2007 | Huang | H01R 12/721 439/327 |
| 2007/0053170 | A1 * | 3/2007 | Yu | H01R 12/7011 361/737 |
| 2009/0186502 | A1 * | 7/2009 | Chen | H01R 12/721 439/157 |
| 2010/0075538 | A1 | 3/2010 | Ohshida | |
| 2011/0021080 | A1 | 1/2011 | Kamiya et al. | |
| 2011/0065297 | A1 | 3/2011 | Guan et al. | |
| 2011/0136388 | A1 | 6/2011 | Fu et al. | |
| 2011/0275238 | A1 | 11/2011 | Iijima et al. | |
| 2012/0178274 | A1 * | 7/2012 | Manickam | H01R 12/7005 439/157 |
| 2012/0202387 | A1 | 8/2012 | McNamara | |
| 2013/0280926 | A1 | 10/2013 | Ono | |
| 2016/0020540 | A1 | 1/2016 | Shen et al. | |
| 2016/0118736 | A1 | 4/2016 | Hoyack et al. | |
| 2016/0190724 | A1 | 6/2016 | Mito | |
| 2016/0336667 | A1 * | 11/2016 | Kee Mew | H01R 12/7005 |
| 2017/0302031 | A1 | 10/2017 | Cheng et al. | |
| 2018/0198220 | A1 | 7/2018 | Sasame et al. | |
| 2018/0261937 | A1 * | 9/2018 | Bu | G06F 1/18 |
| 2019/0165518 | A1 | 5/2019 | Hsu et al. | |
| 2019/0173209 | A1 | 6/2019 | Lu et al. | |
| 2019/0173232 | A1 | 6/2019 | Lu et al. | |
| 2019/0199023 | A1 | 6/2019 | Soh | |
| 2020/0076131 | A1 | 3/2020 | Hu et al. | |
| 2020/0076135 | A1 | 3/2020 | Tang et al. | |
| 2020/0203867 | A1 | 6/2020 | Lu | |
| 2021/0288423 | A1 | 9/2021 | Guo et al. | |
| 2021/0351529 | A1 | 11/2021 | Yang et al. | |
| 2021/0376508 | A1 | 12/2021 | Hu | |
| 2022/0037828 | A1 | 2/2022 | Hu et al. | |
| 2022/0069496 | A1 | 3/2022 | Yi et al. | |
| 2022/0181809 | A1 | 6/2022 | Xie et al. | |
| 2022/0181811 | A1 | 6/2022 | Liu et al. | |
| 2022/0247107 | A1 | 8/2022 | Tang et al. | |
| 2023/0096092 | A1 | 3/2023 | Hu | |
| 2023/0126150 | A1 | 4/2023 | Yang et al. | |
| 2023/0163500 | A1 | 5/2023 | Yang et al. | |
| 2023/0178916 | A1 | 6/2023 | Yang et al. | |
| 2023/0238724 | A1 | 7/2023 | Yang et al. | |

FOREIGN PATENT DOCUMENTS

| | | | |
|---|---|---|---|
| CN | 105703103 | A | 6/2016 |
| CN | 108539464 | A | 9/2018 |
| CN | 212874843 | U | 4/2021 |
| CN | 214505858 | U | 10/2021 |
| TW | 200835073 | A | 8/2008 |
| TW | M475740 | U | 4/2014 |

OTHER PUBLICATIONS

U.S. Appl. No. 17/331,414, filed May 26, 2021, Hu et al.
U.S. Appl. No. 17/386,252, filed Jul. 27, 2021, Hu et al.
U.S. Appl. No. 17/402,255, filed Aug. 13, 2021, Yi et al.
U.S. Appl. No. 17/950,364, filed Sep. 22, 2022, Hu
U.S. Appl. No. 17/973,913, filed Oct. 26, 2022, Yang et al.
U.S. Appl. No. 17/988,330, filed Nov. 16, 2022, Yang et al.
U.S. Appl. No. 18/075,246, filed Dec. 5, 2022, Yang et al.
U.S. Appl. No. 18/101,998, filed Jan. 26, 2023, Yang et al.
U.S. Appl. No. 18/133,601, filed Apr. 12, 2023, He et al.
U.S. Appl. No. 18/346,155, filed Jun. 30, 2023, Yang et al.
He et al., Reliable, Robust Card Edge Connector, U.S. Appl. No. 18/133,601, filed Apr. 12, 2023.
Yang et al., Field Installable Card Edge Connector, U.S. Appl. No. 18/101,998, filed Jan. 26, 2023.
Yang et al., Reliable Card Edge Connector with Narrow Latch, U.S. Appl. No. 18/346,155, filed Jun. 30, 2023.
[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].
[No Author Listed], DDR5 Sdram—Wikipedia. Aug. 8, 2021. 6 pages. URL:https://en.wikipedia.org/wiki/DDR5_SDRAM [last accessed on Aug. 16, 2021].
[No Author Listed], MCIO 124pos 85ohm. Amphenol Assembletech. 1 page. URL:http://www.amphenol-ast.com/v3/en/overview.aspx?classId=234 [retrieved on Apr. 11, 2022].
[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].
[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].
Armasu, What We Know About DDR5 So Far. Jun. 7, 2019. 20 pages. URL:https://www.tomshardware.com/news/what-we-know-ddr5-ram,39079.html [last accessed Jul. 21, 2022].

* cited by examiner

ROBUST CARD EDGE CONNECTOR

RELATED APPLICATIONS

This application claims priority to and the benefit of Chinese Patent Application Serial No. 202221747907.0, filed on Jul. 6, 2022. The contents of this application are incorporated herein by reference in their entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as several printed circuit boards which may be joined together with electrical connectors than to manufacture the system as a single assembly. A known arrangement for joining several printed circuit boards is to have one printed circuit board as a backplane. Then, other circuit boards called daughter boards or daughter cards are connected to the backplane by electrical connectors to interconnect these circuit boards.

Card edge connectors, as electrical connectors, have been widely applied to electronic products, such as computers, which can be used to connect an electronic card, such as a memory card, a graphics card, a sound card and so on, to a circuit board, so that the electronic card can provide the memory capacity for the electronic products and/or enhance the relevant functions, like running rate, of the electronic products. Card edge connectors that receive these add-in cards may be configured for surface mounting to the circuit board, such as using a reflow soldering technique.

A card edge connector may have a pivot-connected latch, thus when the electronic card is inserted in or pulled out, the latch may be pivoted to an unlocked position; after the electronic card is mounted on the card edge connector, the latch may be pivoted to a locked position so as to have the electronic card locked onto the card edge connector. Card edge connectors of this type may be configured, for example, to receive an add-in card for a computer that contains memory chips. Such memory cards may be implemented according to a standard, such as DDR4 or DDR5. Certain aspects of the card edge connector would then also comply with the standard, such as the length and width of a slot that receives the card or the position of the head of the latch relative to the slot.

BRIEF SUMMARY

Aspects of the present application relate to card edge connectors.

Some embodiments relate to a card edge connector. The card edge connector may comprise a housing comprising a body and a tower connected to an end in a longitudinal direction of the body, the tower comprising an outer chamber and an inner chamber joining the outer chamber and the end of the body; and a latch pivotably connected to the tower between a locked position and an unlocked position, the latch comprising a latch body and a protrusion extending from the latch body, wherein, when the latch is in the locked position: the latch body may be at least partially disposed in the outer chamber; and the protrusion may engage a side wall of the inner chamber so that the side wall limits the latch along a transverse direction perpendicular to the longitudinal direction.

Optionally, the outer chamber may comprise a side wall joining the side wall of the inner chamber; and a transverse dimension of the side wall of the inner chamber may be greater than a transverse dimension of the side wall of the outer chamber.

Optionally, when the latch is in the locked position: the latch body may be adjacent the side wall of the outer chamber; and the protrusion contacts the side wall of the inner chamber.

Optionally, the transverse dimension of the side wall of the outer chamber may be in the range of 0.6 mm to 0.8 mm; and/or a longitudinal dimension of the side wall of the outer chamber may be in the range of 2.5 mm to 2.7 mm.

Optionally, the protrusion may comprise a surface engaging the side wall of the inner chamber; and the surface of the protrusion comprising a guiding portion inclining toward an interior of the inner chamber.

Optionally, the housing may comprise a slot extending from the body to the tower; and the inner chamber may connect the outer chamber and the slot.

Optionally, the protrusion may be configured to protrude into the slot when the latch is pivoted into the locked position.

Optionally, the protrusion may be a first protrusion; the latch may comprise a second protrusion extending from the latch body; and the first protrusion and the second protrusion may engage respective side walls of the inner chamber when the latch is in the locked position.

Optionally, the tower may comprise a portion connecting the pair of side wall of the inner chamber; and the card edge connector may comprise a reinforcing member disposed in the portion of the tower and at least partially encircling an end of the slot.

Optionally, the first protrusion and the second protrusion may be disposed on opposite sides of the slot along a transverse direction.

Optionally, the first protrusion and the second protrusion may be separated from each other by a distance in the transverse direction; and the distance may be less than a transverse width of the slot.

Optionally, the latch body may comprise a heat dissipation through-hole coupled to the slot; and the first protrusion and the second protrusion may be disposed on opposite sides of the heat dissipation through-hole.

Optionally, the first protrusion and the second protrusion may comprise respective inner sides facing each other; and the respective inner sides of the first protrusion and the second protrusion may be disposed on opposite sides of the heat dissipation through-hole.

Some embodiments relate to a latch for a card edge connector. The latch may comprise a body elongated in a vertical direction; and a pair of protrusions extending from the body, each of the pair of protrusions elongated in the vertical direction and protruding in a longitudinal direction perpendicular to the vertical direction, wherein: the pair of protrusions may be spaced from each other in a transverse direction perpendicular to both the vertical direction and the longitudinal direction.

Optionally, each of the pair of protrusions may have a transverse dimension in the range of 1.2 mm to 2.0 mm.

Optionally, the latch may comprise a heat dissipation through-hole through the body, wherein: the first protrusion and the second protrusion may be disposed on opposite sides of the heat dissipation through-hole.

Optionally, the latch may comprise a pair of bulges extending from the body, each of the pair of bulges protruding outward from the body in the transverse direction.

Optionally, the latch may comprise a pair of hubs extending from the body and configured to pivotably engage a housing of the card edge connector; and an operating portion disposed at a distal end of the latch and configured to receive forces that pivot the latch.

Some embodiments relate to an electronic system, which may include an electrical connector and a latch. The electrical connector may include a housing comprising a tower disposed at an end of the housing and a slot elongated along the housing, the tower comprising an outer chamber and an inner chamber joining the outer chamber and slot, the outer chamber and the inner chamber comprising joined side walls, the side walls of the inner chamber being thicker than the side walls of the outer chamber; and a latch disposed in the tower, the latch comprising a latch body engaging the side walls of the outer chamber and a pair of protrusions extending from the latch body and engaging the side walls of the inner chamber. The electronic card may be disposed in the slot of the housing.

Optionally, the pair of protrusions may fit snugly between the electronic card and the side walls of the inner chamber.

Some embodiments relate to a card edge connector. The card edge connector may comprise an insulating housing and a latch. The insulating housing may include a body and a tower. The tower connected to an end in a longitudinal direction of the body. An outer chamber and an inner chamber sequentially provided on the tower along the longitudinal direction. The latch connected to the tower may be pivotable between a locked position and an unlocked position for locking and releasing an electronic card connected to the insulating housing. The latch may include a latch body and a protrusion provided on the latch body. When the latch is in the locked position, the latch body may be accommodated within the outer chamber, and the protrusion may engage a pair of side walls of the inner chamber so that the pair of side walls limits the latch along a transverse direction perpendicular to the longitudinal direction.

Optionally, a slot may be provided on the insulating housing. The slot may extend from the body to the tower along the longitudinal direction. The inner chamber may be coupled to the outer chamber and the slot.

Optionally, the protrusion may protrude into the slot along the transverse direction, so that the electronic card when being inserted into the slot squeezes outward the protrusion.

Optionally, the protrusion may include a first protrusion and a second protrusion. The first protrusion and the second protrusion may engage the pair of side walls of the inner chamber, respectively, when the latch is in the locked position.

Optionally, the first protrusion and the second protrusion may be disposed on both sides of the slot along the transverse direction, respectively.

Optionally, the distance between the first protrusion and the second protrusion may be less than the transverse width of the slot, so that the first protrusion and the second protrusion clamp the electronic card when the latch is in the locked position.

Optionally, a heat dissipation through-hole extending along the longitudinal direction may be provided on the latch body. The heat dissipation through-hole may be coupled to the slot. The first protrusion and the second protrusion may be disposed on both sides of the heat dissipation through-hole, respectively.

Optionally, the first protrusion and the second protrusion may be spaced apart from the slot along the longitudinal direction when the latch is in the locked position. The opposite inner sides of the first protrusion and the second protrusion may be adaptive to the opposite sides of the heat dissipation through-hole.

Optionally, the transverse dimension of each of the first protrusion and the second protrusion may be greater than or equal to 1.2 mm.

Optionally, the protrusion may be spaced apart from the slot along the longitudinal direction.

Optionally, the protrusion may extend from the latch body toward the body along the longitudinal direction.

Optionally, the transverse dimension of the side walls of the inner chamber may be greater than or equal to that of the side walls of the outer chamber.

Optionally, the transverse dimension of the side walls of the outer chamber may be less than or equal to 0.8 mm, and/or the longitudinal dimension of the side walls of the outer chamber may be greater than or equal to 2.5 mm.

Optionally, the latch body may be locked to the side wall of the outer chamber when the latch is in the locked position.

Optionally, the tower may have a portion connected to the pair of side walls of the inner chamber, wherein along a vertical direction perpendicular to the longitudinal direction and the transverse direction, the protrusion may engage the pair of side walls between the portion and the body.

Optionally, a reinforcing member may be provided in the portion. A slot may be provided on the insulating housing. The slot may extend from the body to the tower along the longitudinal direction. The reinforcing member may at least partially encircle an end of the slot.

Optionally, a section of the reinforcing member parallel to the longitudinal direction and the transverse direction may be of a U-shape. The end of the slot may extend into an opening of the U-shape.

Optionally, when the latch is in the locked position, the reinforcing member and the protrusion may be sequentially disposed along the vertical direction.

Optionally, the protrusion may have an engaging surface engaging the pair of side walls of the inner chamber. A part of the engaging surface close to the body may incline toward the interior of the inner chamber to form a guiding portion.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1:
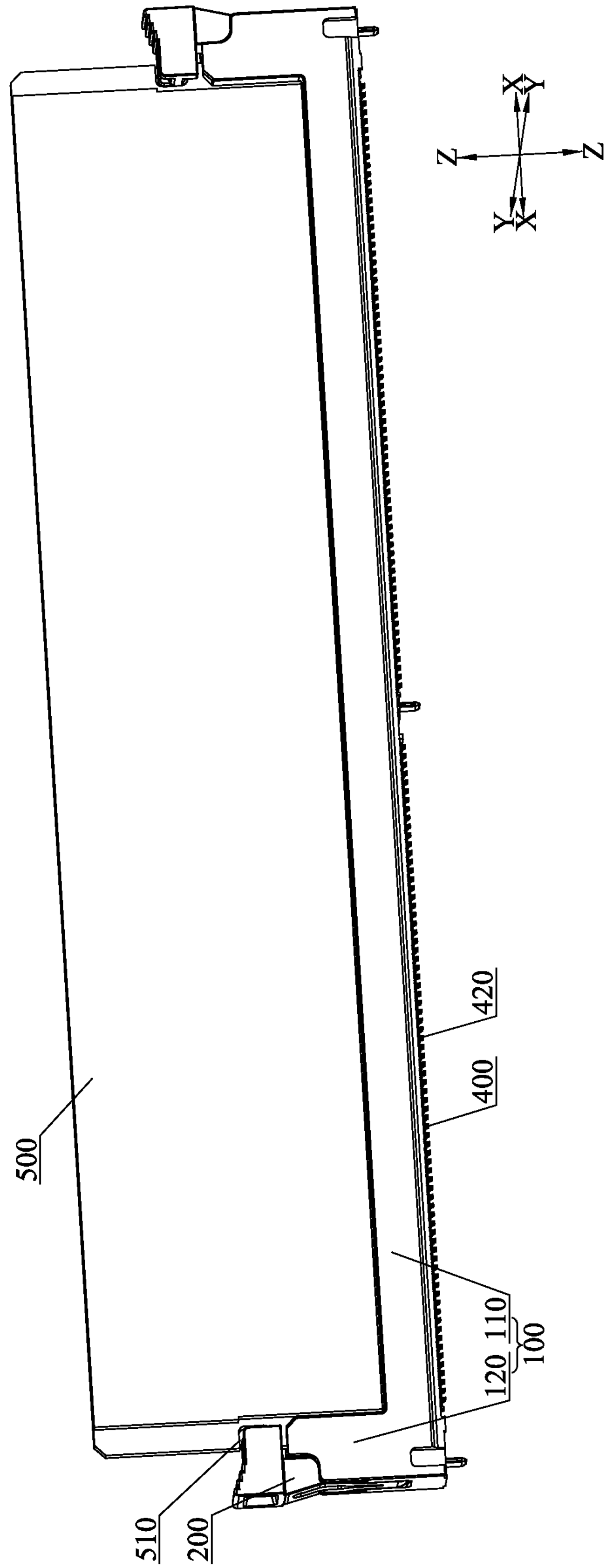
FIG. 1 is a perspective view of a card edge connector connected with an electronic card according to an exemplary embodiment of the present disclosure, wherein a latch is at a locked position.

Wherein, the aforesaid drawings include the following drawing signs:

100, insulating housing; 101, mating surface; 102, mounting surface; 110, body; 120, tower; 130, outer chamber; 131, side wall of outer chamber; 131*a*, upper part of side wall 131; 131*b*, lower part of side wall 131; 132, end wall of outer chamber; 140, inner chamber; 141, side wall of inner chamber; 150, slot; 151, side wall of slot; 160, portion; 170, groove; 171, first step; 172, second step; 173, first recess; 174, second recess; 175, third recess; 180, recessed portion; 190, clamping recess; 200, 200', latch; 210, latch body; 211, heat dissipation through-hole; 220, 220', protrusion; 221, 221', first protrusion; 222, 222', second protrusion; 223, engaging surface; 223*a*, guiding portion; 230, operating portion; 240, hub; 250, bulge; 270, transverse rib; 300, reinforcing member; 301, opening; 310, transverse portion; 321, first longitudinal portion; 322, second longitudinal portion; 330, elastic portion; 341, first extension portion; 342, second extension portion; 351, first arc transition portion; 352, second arc transition portion; 361, first positioning protrusion; 362, second positioning protrusion; 363, third positioning protrusion; 400, conductor; 410, mating end; 420, mounting tail; 500, electronic card; 510, notch.

DETAILED DESCRIPTION

The inventors have recognized and appreciated connector designs that contribute to reliable performance of systems using card edge connectors. Card edge connectors may be used in electronic systems for interconnection between circuit boards. As an example, a DIMM (Dual-Inline-Memory-Module) may be interconnected with a computer mainboard via a card edge connector. The card edge connector may be fixed onto the mainboard, and conductors on the card edge connector may be interconnected with a circuit on the mainboard. The DIMM may be inserted into a slot of the card edge connector, thus the DIMM may be regarded as an internal memory card. The card edge connector may comprise a latch pivotably connected to an insulating housing of the card edge connector and configured to retain and release an internal memory card. After the internal memory card is inserted into a slot of the insulating housing, the latch may be rotated to a locked position to firmly retain the internal memory card in the slot.

Conventionally, an electronic card may have notches on, for example, opposite sides of the card, corresponding to the latches on opposite sides of a card edge connector. When the electronic card is inserted into the slot of the connector and the latches are pivoted to their locked positions, the latches may hold edges of the notches, thereby retaining the internal memory card in the slot of the card edge connector. However, the electronic card may shake relative to the card edge connector as a result of vibration or other operating conditions of the system, which may weaken or disrupt the connection between the electronic card and the card edge connector.

The inventors have recognized and appreciated connector structures that may reduce such shaking, even after the connector has been exposed to the heat of solder reflow for mounting to a printed circuit board. While the bottom of the electronic card is inserted into the slot of the insulating housing and therefore relatively secured in the slot, gaps may exist between the latches and the insulating housing. Such gaps provide spaces for the latches to move in the insulating housing as a result of vibration or other operating conditions of the system. Since the latches hold the notches of the electronic card, the electronic card may move with the latches.

The inventors also have recognized and appreciated that while connectors may not be designed with the gaps, the gaps may be created due to undesired deformation of the insulating housing. For example, the connectors may be mounted to a mainboard using Surface Mounted Technology (SMT). The conductors held by the insulating housing may be mounted onto the mainboard by soldering, which may include a reflow process. During the reflow process, side walls of an outer chamber on the insulating housing for accommodating the latch are more prone to deformation due to the heat involved in the reflow process. A heat dissipation through-hole may be provided at the upper part of the latch, and in order to maintain the mechanical strength of the upper part of the latch, the width of the upper part may be greater than that of the lower part of the latch, and the lower part of the latch may be solid, resulting in the side walls at the upper part of the outer chamber being thinner. Also, in some embodiments, a bulge may be provided on the upper part of the latch, and a clamping recess mated with the bulge may be provided on the side walls at the upper part of the outer chamber, which may further reduce the thicknesses of the side walls of the outer chamber. As illustrated, the side walls of the outer chamber have a certain length along a longitudinal direction, which may depend on the shape of the latch. The inventors have recognized and appreciated that the side walls of the outer chamber are more prone to deformation when the side walls of the outer chamber have a larger length and/or a smaller thickness. The deformation of side walls of the outer chamber provides more spaces for the latch to move therein, causing the electronic card to also shake in the insulating housing.

The inventors have recognized and appreciated connector designs that reduce the risk that the latches, and therefore the card held by the latches, move in the insulating housing, thereby improving the stability of the interconnection system. In some embodiments of the present disclosure, a protrusion may be provided on the latch. The protrusion may be inserted into an inner chamber of the insulating housing to engage a pair of side walls of the inner chamber. The protrusion may allow the pair of side walls to limit the latch along a transverse direction. In this way, even if the side walls of the outer chamber are deformed during the reflow process, the latch may engage the side walls of the inner chamber, which may ensure the stability of the latch and the electronic card.

A vertical direction Z-Z, a longitudinal direction X-X, and a transverse direction Y-Y described herein may be perpendicular to one another. The vertical direction Z-Z may refer to a height direction of the card edge connector, the longitudinal direction X-X may refer to a length direction of the card edge connector, and the transverse direction Y-Y may refer to a width direction of the card edge connector.

Figure 2:
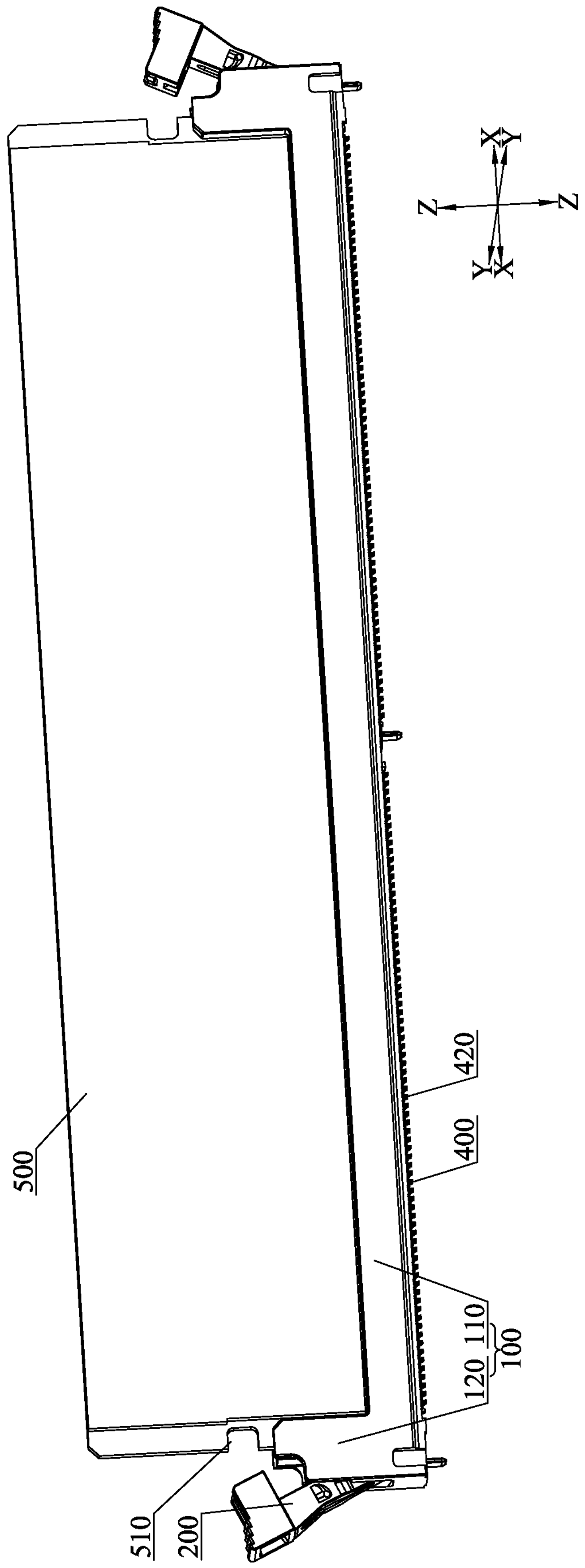
FIG. 2 is a perspective view of the card edge connector connected with the electronic card shown in FIG. 1, wherein the latch is at an unlocked position.
Figure 3:
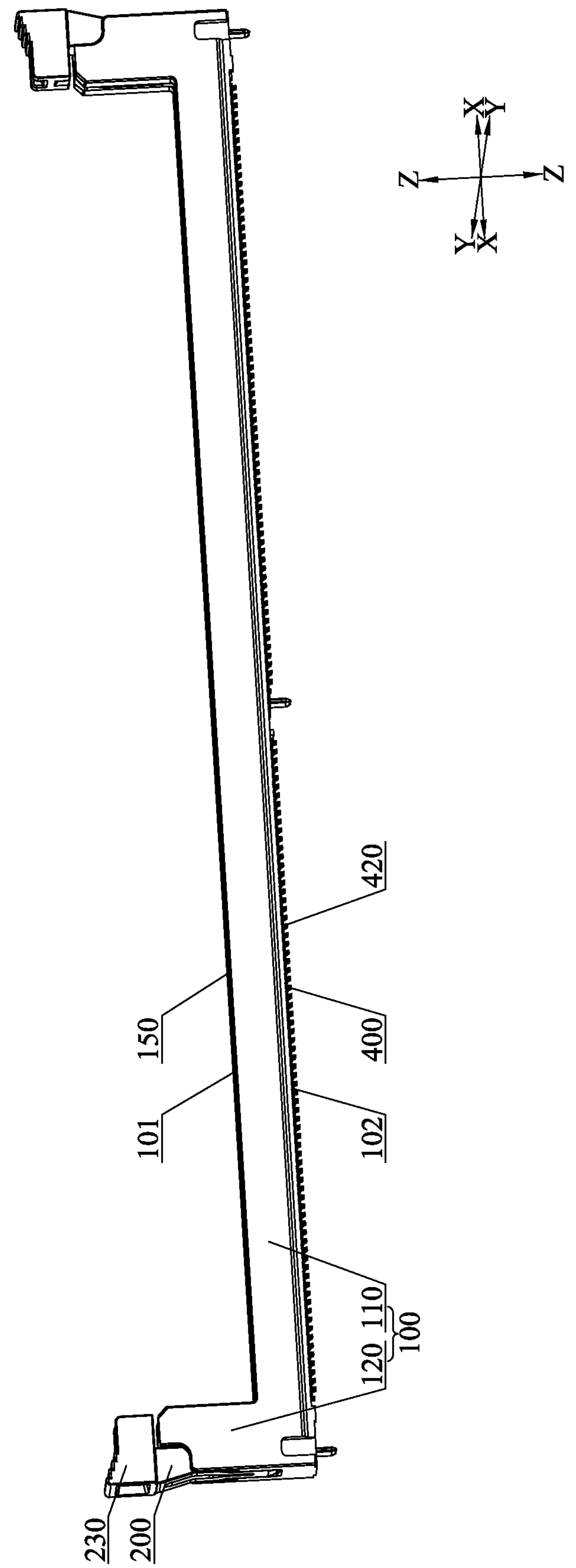
FIG. 3 is a perspective view of a card edge connector according to an exemplary embodiment of the present disclosure.

As shown in FIGS. 1-3, a card edge connector may include an insulating housing 100 and a latch 200. The insulating housing 100 may be molded with insulating materials, such as plastics. The insulating housing 100 may be an integrated piece. The insulating housing 100 may have a mating surface 101 and a mounting surface 102. The mating surface 101 and the mounting surface 102 may be disposed opposite along the vertical direction Z-Z.

Figure 4:
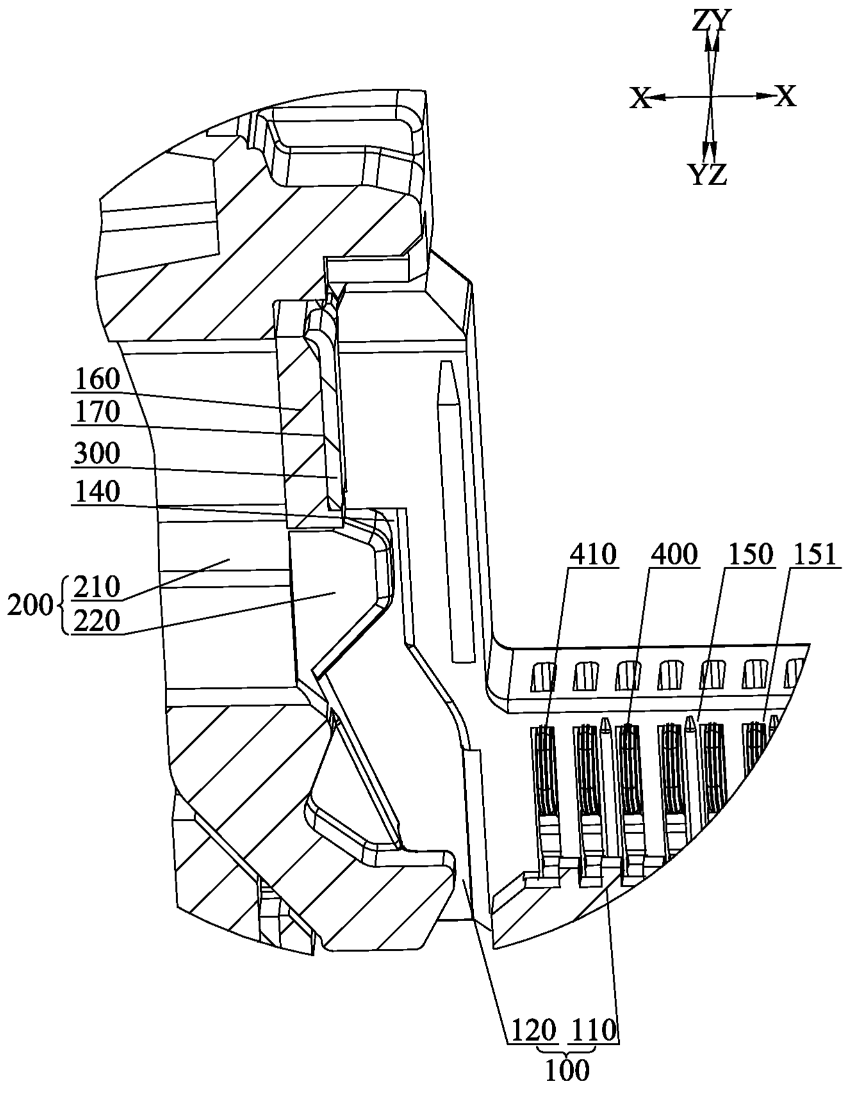
FIG. 4 is a partial sectional view of the card edge connector shown in FIG. 3 taken by a plane perpendicular to a transverse direction.
Figure 5:
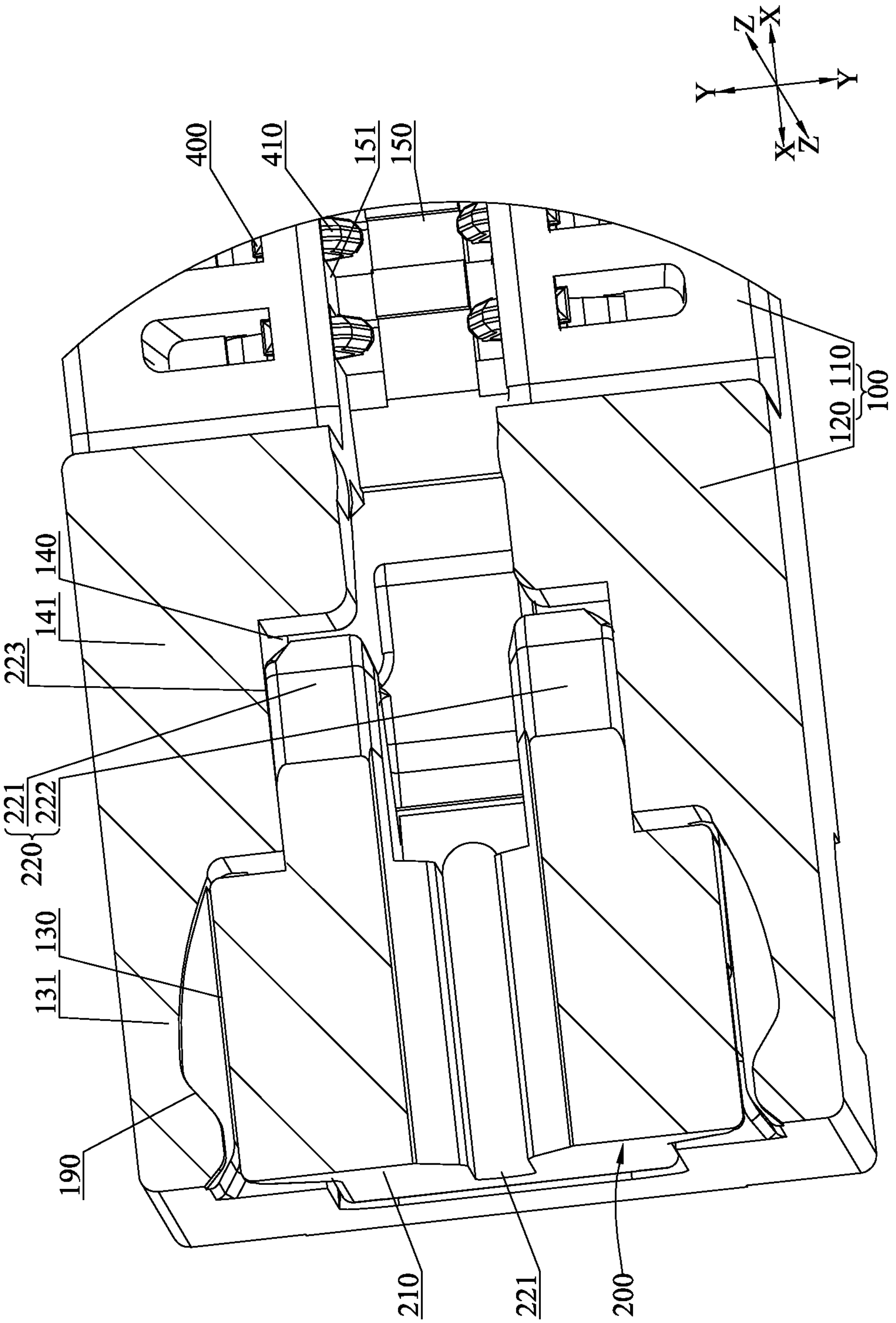
FIG. 5 is a partial sectional view of the card edge connector shown in FIG. 3 taken by a plane perpendicular to a vertical direction.

A plurality of conductors 400 may be held in the insulating housing 100. The adjacent conductors 400 may be spaced apart to ensure that the adjacent conductors 400 are electrically insulated from each other. The conductors 400 may be made of conductive materials, such as metal. The conductors 400 may be elongated one-piece members. Each conductor 400 along its extension direction may include a mating end 410 (see FIGS. 4-5) and a mounting tail 420 (see FIGS. 1-3) disposed at both ends of the conductor 400. The mating end 410 may be used to electrically connect with a circuit on an electronic card 500. The electronic card 500 includes but not limited to internal memory card and graphics card, etc. The mounting tail 420 may be connected with a pad on the mainboard by reflow soldering. In this way, the electronic card 500 electrically connects with the card edge connector, thereby achieving the interconnection between the circuit on the electronic card 500 and that on the mainboard. The mating end 410 of the conductor 400 may extend to the mating surface 101, As illustrated, into a slot 150 on the mating surface 101, as shown in FIGS. 4-5. The mounting tail 420 of the conductor 400 may extend outside the mounting surface 102. The conductors 400 may be arranged in two rows on both sides of the slot 150, with each row extending along the longitudinal direction X-X. Optionally, the two rows of conductors 400 may be aligned with each other along the longitudinal direction X-X. Optionally, the two rows of conductors 400 may be staggered along the longitudinal direction X-X to increase the space between the conductors 400 to reduce crosstalk.

The insulating housing 100 may include a body 110 and a tower 120. The body 110 may extend along the longitudinal direction X-X. The tower 120 may be connected to an end in the longitudinal direction X-X of the body 110. The tower 120 may extend along the vertical direction Z-Z to protrude upward from the end of the body 110. The orientation terms used herein may be relative to the arrangement state of the card edge connector as shown in FIGS. 1-3. For example, the side where the mating surface 101 is located is the upper side, and the side where the opposite mounting surface 102 is located is the lower side.

Exemplarily, the tower 120 may be provided on only one end along the longitudinal direction X-X of the body 110. Optionally, the towers 120 may be provided on both ends along the longitudinal direction X-X of the body 110. The towers 120 may be disposed at the opposite sides along the longitudinal direction X-X of the body 110, respectively. The tower 120 may serve as a longitudinal end of the insulating housing 100.

Figure 6:
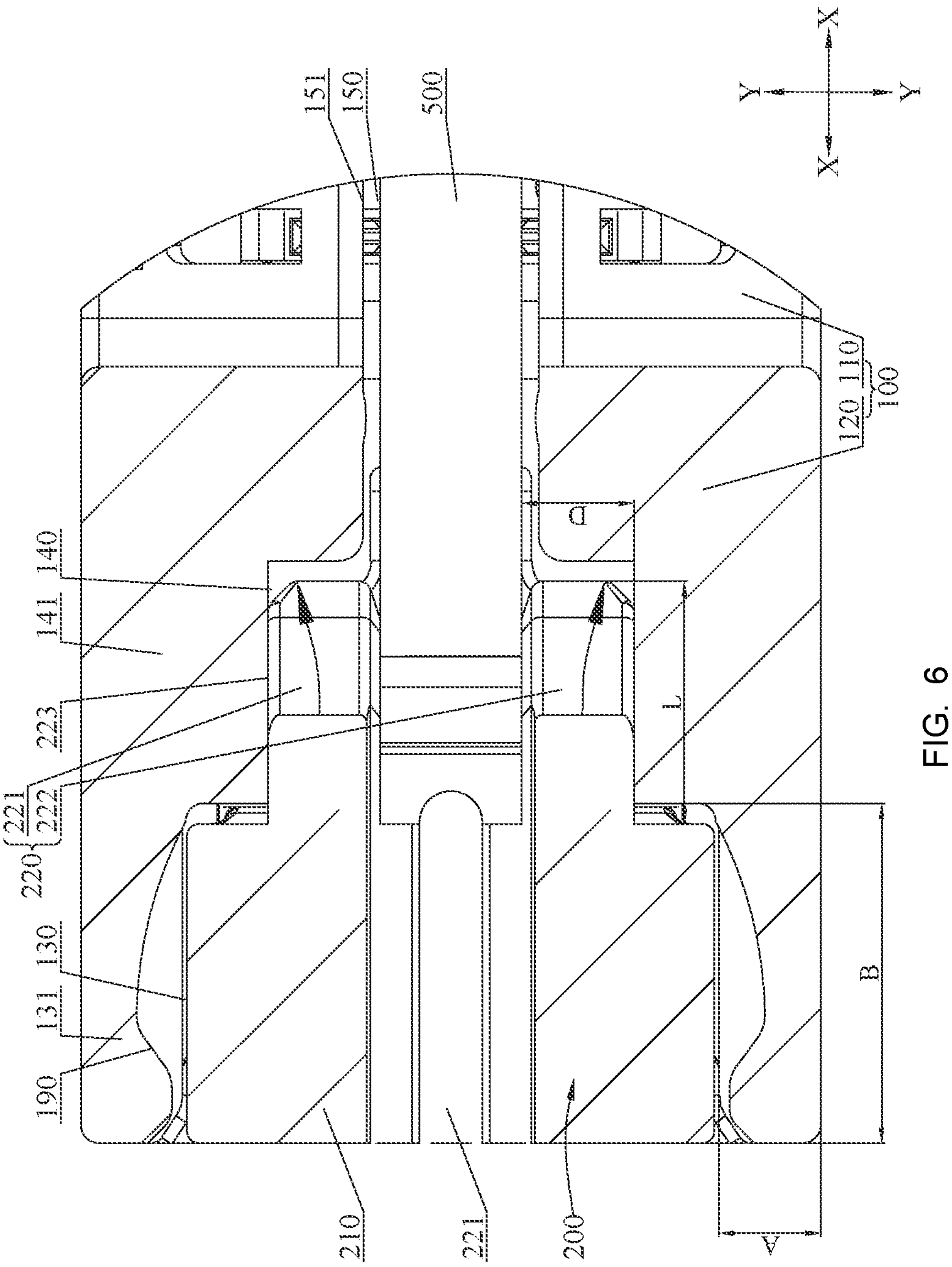
FIG. 6 is a diagram of the card edge connector connected with the electronic card shown in FIG. 3.
Figure 7:
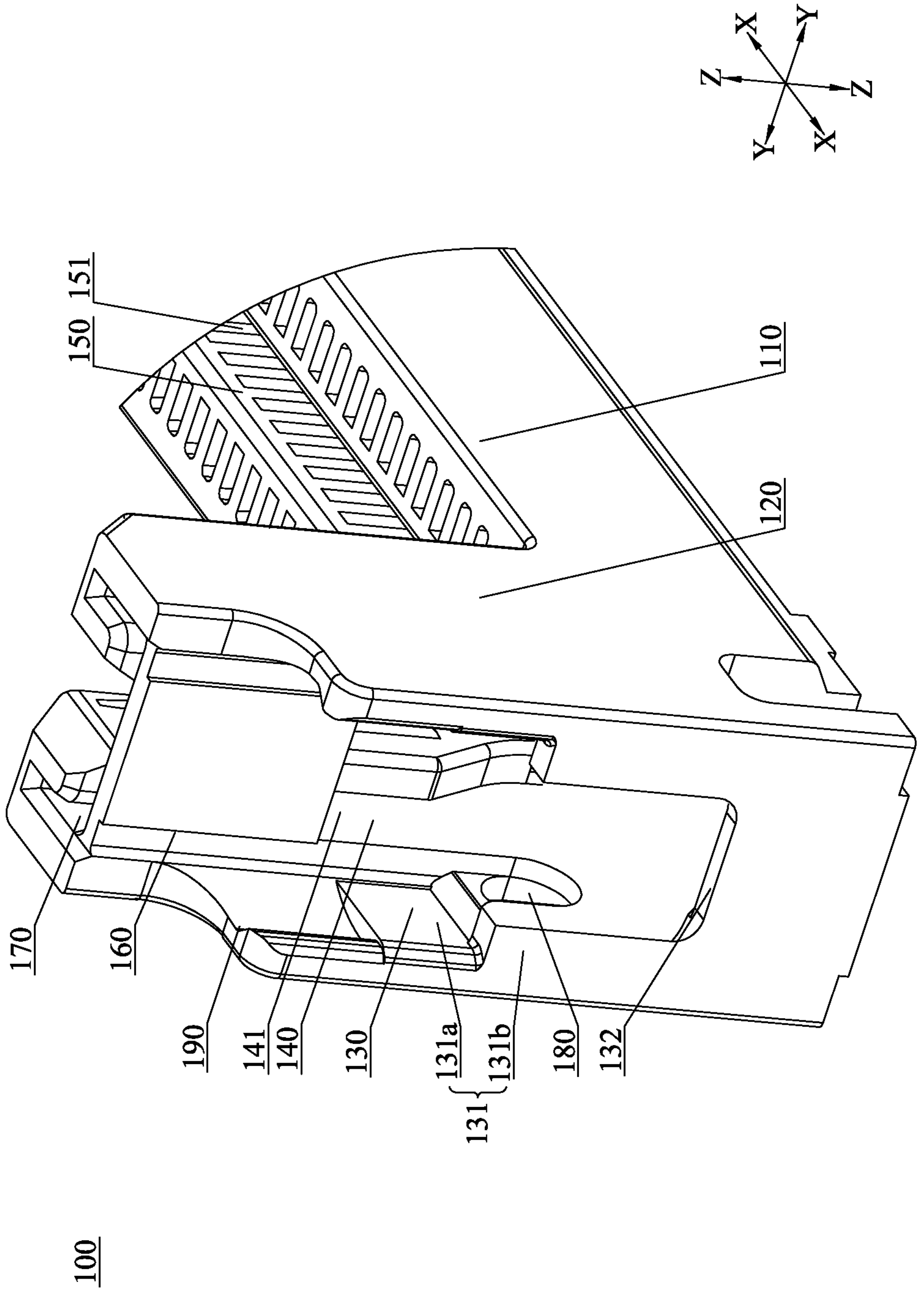
FIG. 7 is a partial perspective view of an insulating housing of the card edge connector shown in FIG. 3 from one perspective.

An outer chamber 130 and an inner chamber 140 may be sequentially provided along the longitudinal direction X-X on the tower 120 as shown in FIGS. 5-7. The outer chamber 130 may be disposed at the outer side along the longitudinal direction X-X of the inner chamber 140. The outer chamber 130 may be depressed inward along the longitudinal direction X-X from the end face of the tower 120. The outer chamber 130 may have a pair of side walls 131 spaced apart along the transverse direction Y-Y. The outer chamber 130 may extend to the top of the tower 120.

Figure 8:
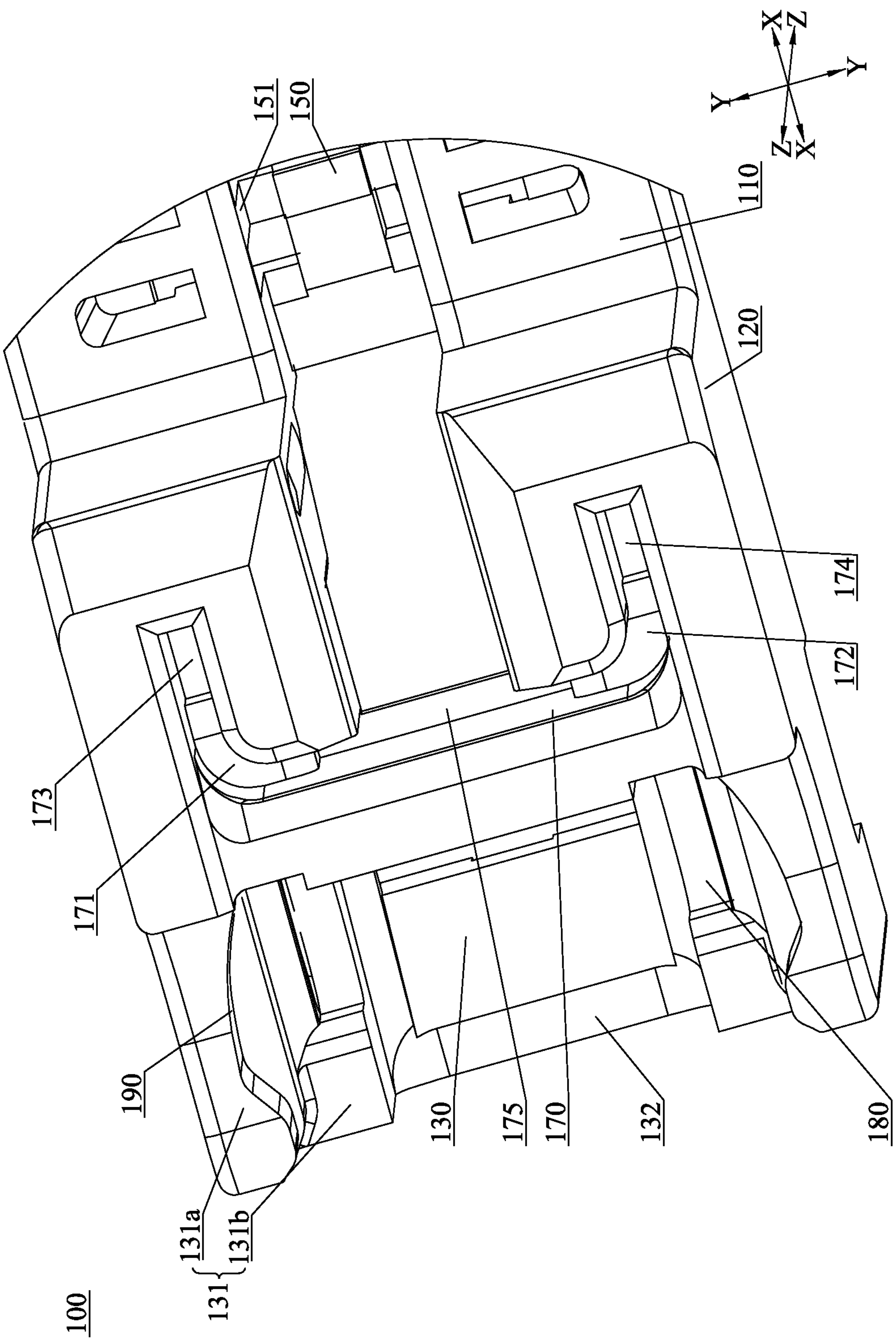
FIG. 8 is a partial perspective view of the insulating housing of the card edge connector shown in FIG. 3 from another perspective.
Figure 9:
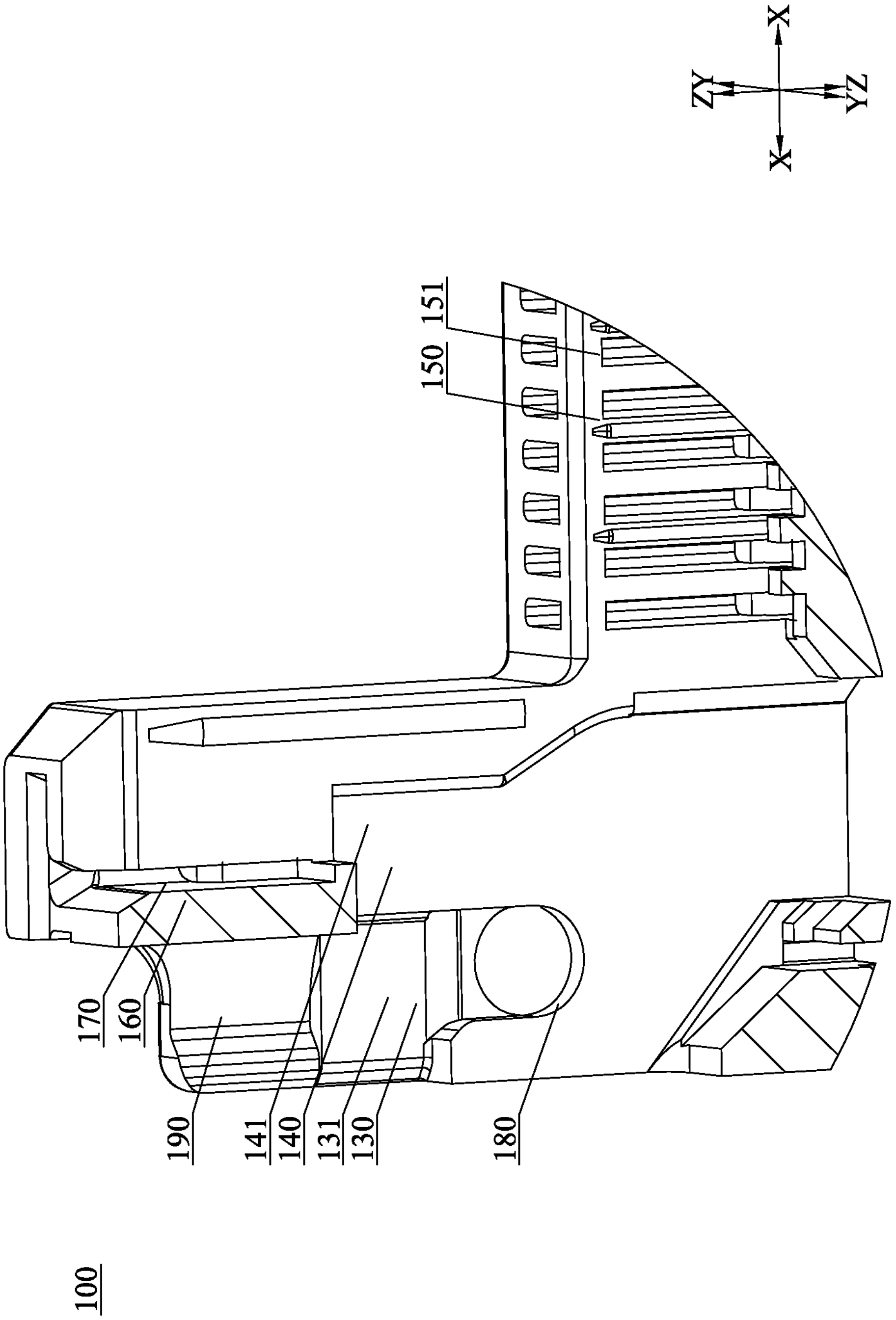
FIG. 9 is a partial sectional view of the insulating housing of the card edge connector shown in FIG. 3 taken by a plane perpendicular to the transverse direction.
Figure 10:
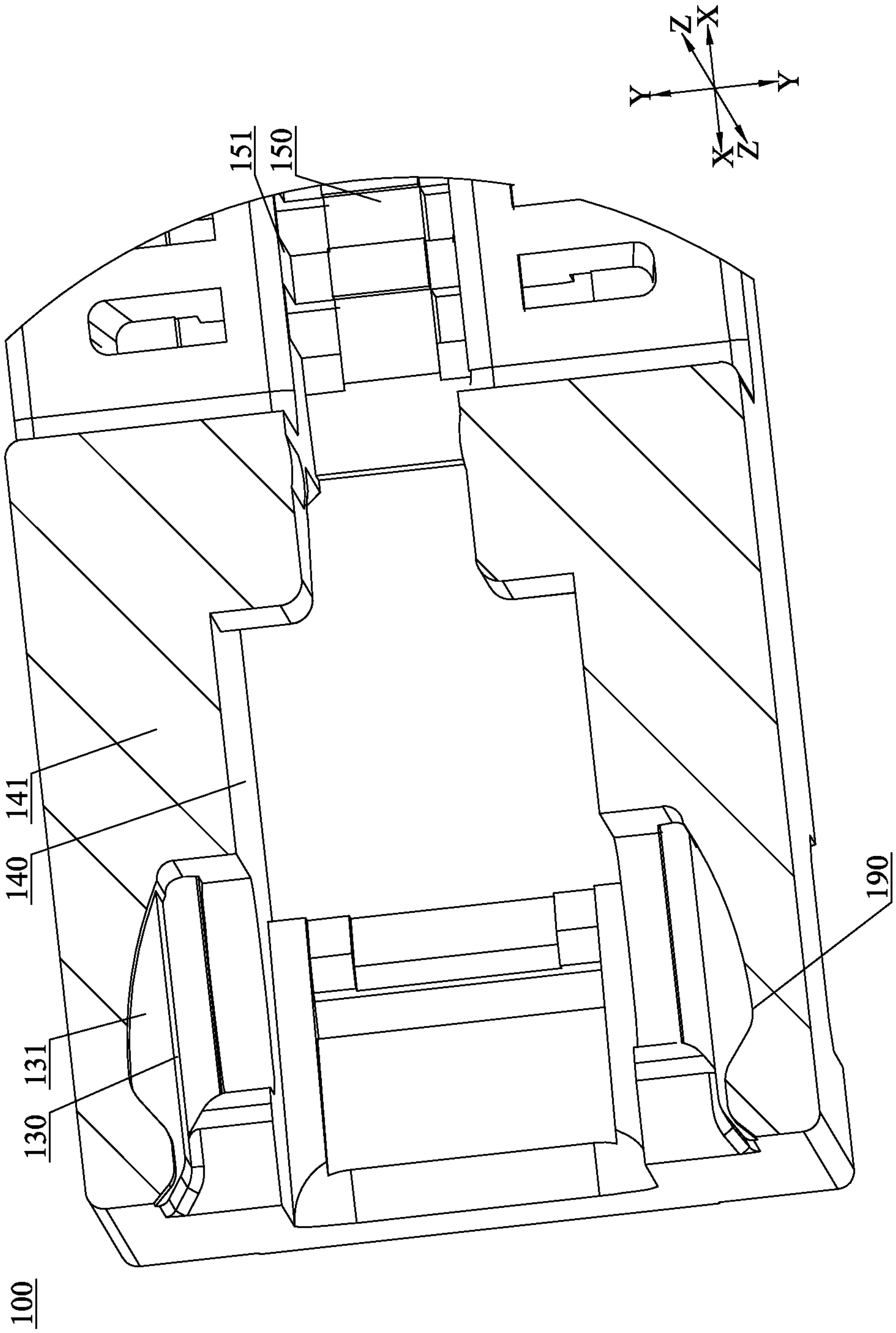
FIG. 10 is a partial sectional view of the insulating housing of the card edge connector shown in FIG. 3 taken by a plane perpendicular to the vertical direction.
Figure 12:
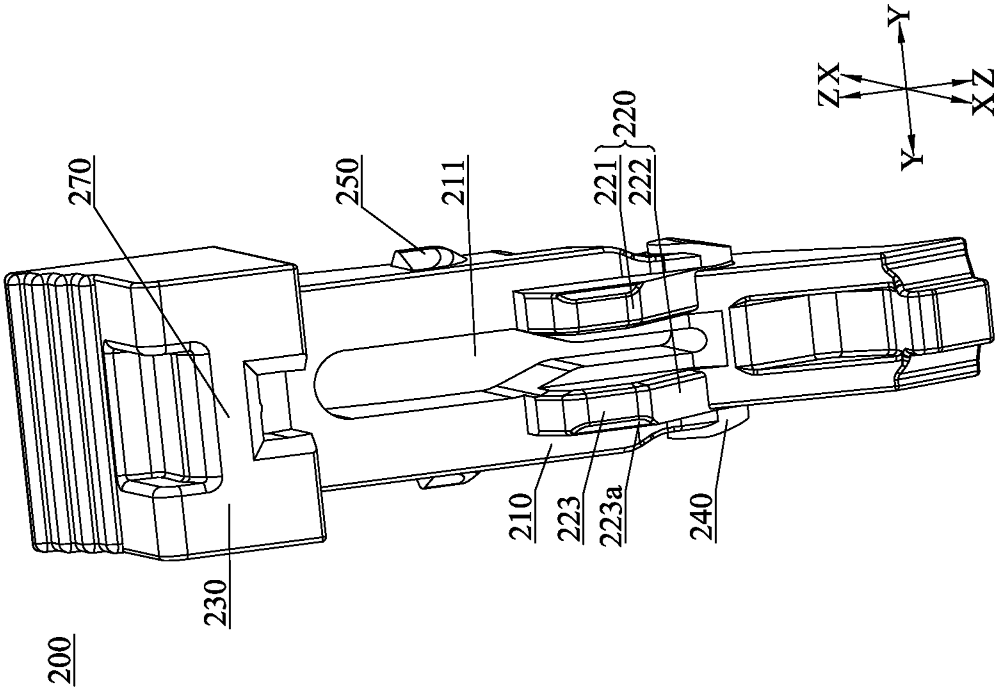
FIG. 12 is a perspective view the latch shown in FIG. 4 from another perspective.
Figure 11:
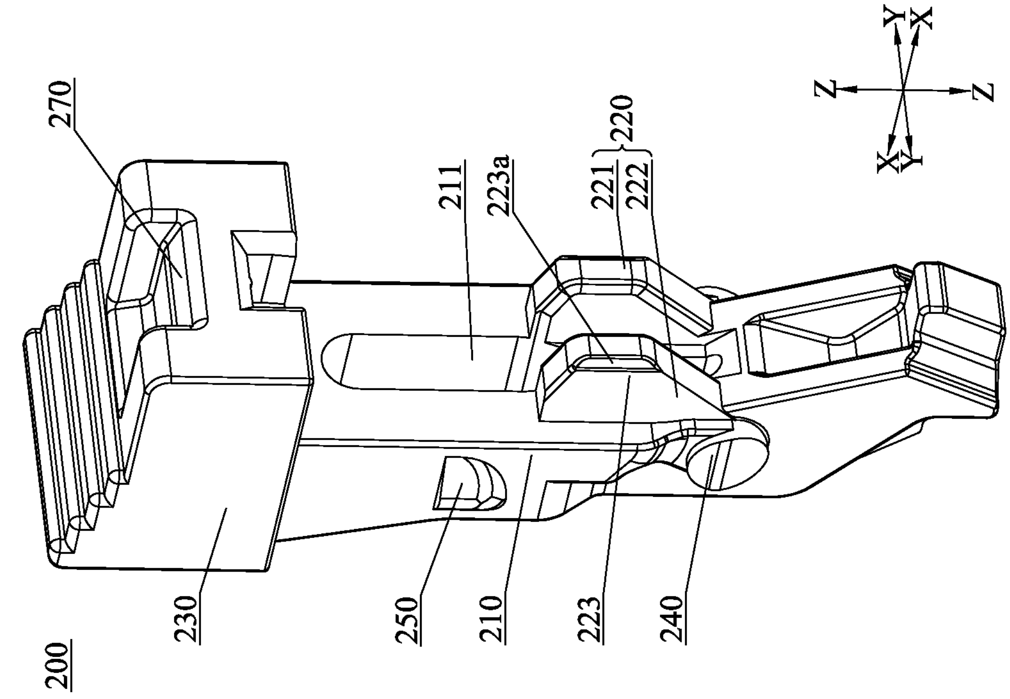
FIG. 11 is a perspective view the latch shown in FIG. 4 from one perspective.
Figure 13:
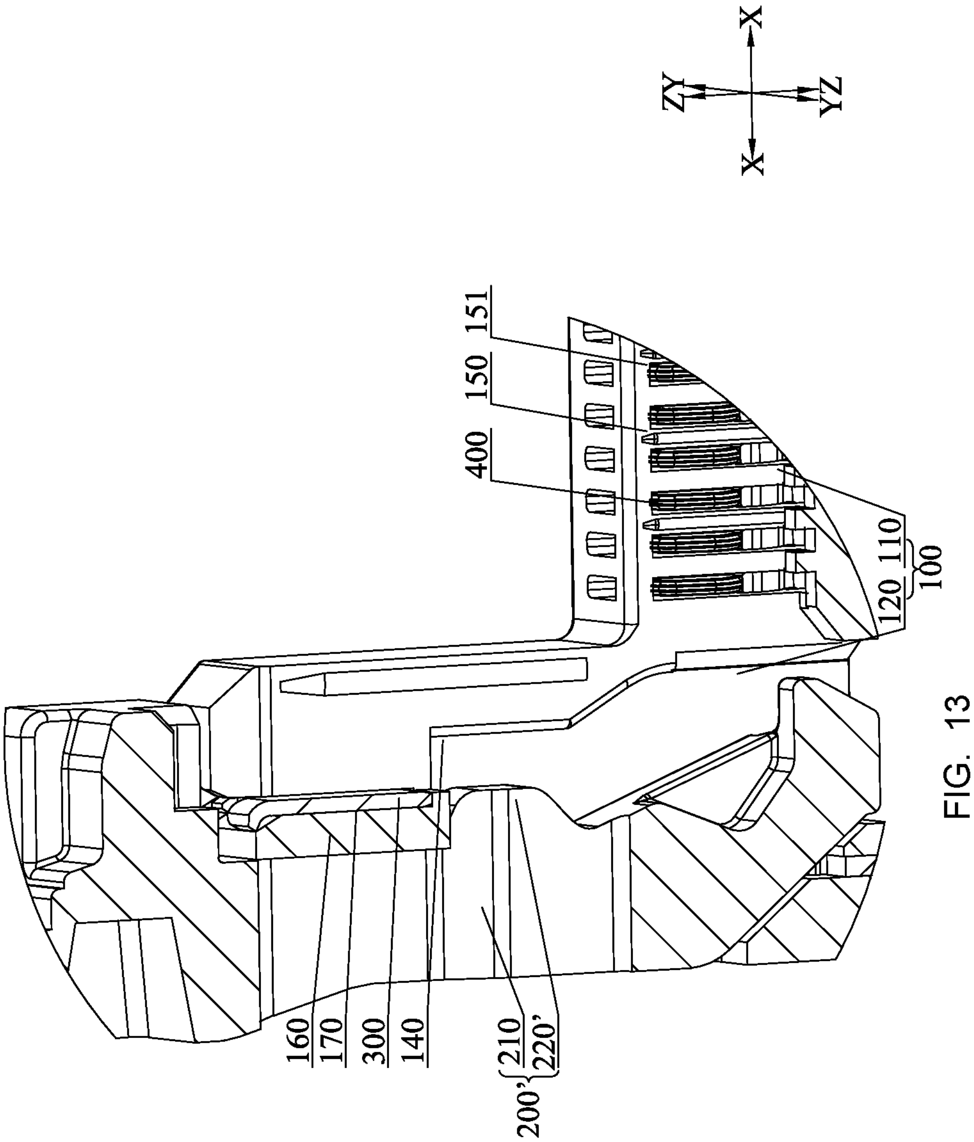
FIG. 13 is a partial sectional view of a card edge connector according to another exemplary embodiment taken by a plane perpendicular to the transverse direction.

As shown in FIGS. 11-12, a heat dissipation through-hole 211 is provided on the upper part of the latch 200 and aligned with the slot 150. In the case of faster data processing speed, the electronic system generates more heat during work. However, the circuits on the circuit board are getting denser, and the gap between the adjacent electrical connectors is smaller or hardly set, which is not conducive to heat dissipation. In particular, where a plurality of card edge connectors are arranged side by side along the transverse direction Y-Y and close to one another, heat dissipation mainly depends on the ventilation along the longitudinal direction X-X. In this case, it may be desired that the heat dissipation through-hole 211 is larger for dissipating heat, which however may reduce the mechanical strength of the latch 200. The width of the upper part of the latch 200 may therefore be larger. The lower part of the latch 200 is solid and provided with a projecting hub 240. The hub 240 may be mated with a recessed portion 180 provided on the lower part of the side wall 131 of the outer chamber 130 to achieve pivot connection. As shown in FIGS. 7-8, the thickness of a lower part **131*b* of the side wall 131 may be greater than that of an upper part 131*a* of the side wall 131. And the lower parts 131*b* of the pair of side walls 131 may be connected via an end wall 132 of the outer chamber. Therefore, in the process of reflow soldering, the deformation mainly occurs at the upper part 131*a* of the side wall 131. As illustrated, where the upper part 131*a* of the side wall 131 is provided with a clamping recess 190 (as shown in FIGS. 5-9) for clamping a bulge 250 (as shown in FIGS. 11-12) on the latch 200, the thickness of the upper part 131*a* of the side wall 131** would be further reduced, which further aggravates the deformation in the process of welding.

Exemplarily, the latch 200 may be inserted into the tower 120 from the above along a direction at an acute angle to both the vertical direction Z-Z and the longitudinal direction X-X. As illustrated, referring to FIG. 2, the left latch 200 may be inserted into the tower 120 along a direction from the upper left to the lower right in the figure; while the right latch 200 may be inserted into the tower 120 along a direction from the upper right to the lower left in the figure. After the latch 200 is inserted into the tower 120, the hub 240 may be connected to the recessed portion 180 to make the latch 200 pivotable relative to the tower 120.

The latch 200 may be molded with insulating materials, such as plastics, by molding process. The latch 200 may be a one-piece member. The materials of the latch 200 and the insulating housing 100 may be the same or different. The latch 200 may be pivotably connected to the tower 120 between the locked position and the unlocked position.

The latch 200 may be used to retain and release the electronic card 500 connected to the insulating housing 100. As illustrated, the latch 200 in FIG. 1 is in the locked position, and a transverse rib 270 at the upper part of the latch 200 (as shown in FIGS. 11-12) may extend into a notch 510 on the electronic card 500, thereby clamping the edge of the notch 510, thus the latch 200 can retain the electronic card 500 in the slot 150 the insulating housing 100. In FIG. 2, the latch 200 is in the unlocked position, and the latch 200 pivots outward and the transverse rib 270 exits from the notch 510, thus the electronic card 500 can be removed from the insulating housing 100. The electronic card 500 can be inserted into the insulating housing 100 with the latch 200 being in the unlocked position.

As shown in FIGS. 4-5, the latch 200 may include a latch body 210 and a protrusion 220 disposed on the latch body 210. When the latch 200 is in the locked position, the latch body 210 may be accommodated within the outer chamber 130. The latch body 210 may be locked to the side wall 131 of the outer chamber when the latch 200 is in the locked position to limit the latch 200 along the longitudinal direction X-X, so that the stability of the latch 200 can be maintained to a certain extent. Optionally, the positions of the bulge 250 and the clamping recess 190 on the latch body 210 and the side wall 131 of the outer chamber are interchangeable. Other structures may be used to lock the latch body 210 to the side wall 131 of the outer chamber.

As illustrated, the inner chamber 140 is further depressed from the outer chamber 130 along the longitudinal direction X-X. The inner chamber 140 may have a pair of side walls 141 spaced apart along the transverse direction Y-Y. The inner chamber 140 may be closer to the body 110 as well as the slot 150 than the outer chamber 130. In the illustrated example, along the longitudinal direction X-X, the outer chamber 130, the inner chamber 140, and the slot 150 are arranged sequentially and their centers are in the same line. In other examples, the centers of the outer chamber 130, the inner chamber 140, and the slot 150 may not be collinear. The inner chamber 140 may have the same width as the lower part of the outer chamber 130. Exemplarily, the pair of side walls 141 of the inner chamber 140 respectively have the same thickness as the lower parts 131*b* of the pair of side walls 131 of the outer chamber 130, and they respectively connect the lower parts 131*b* of the pair of side walls 131 to make the whole surface formed by the two connected walls flat.

Optionally, to facilitate the operation of the latch 200, an operating portion 230 may be provided on the upper end of the latch 200. The operating portion 230 may include one or more kinds of antiskid stripes, recessed grooves and steps. The operating portion 230 may help users to pivot the latch 200 between the locked position and the unlocked position, especially from the locked position to the unlocked position.

The protrusion 220 may be inserted into the inner chamber 140. The protrusion 220 may engage the pair of side walls 141 of the inner chamber 140 to make the pair of side walls 141 of the inner chamber limit the protrusion 220 in the transverse direction Y-Y so as to limit the latch 200. As illustrated, the protrusion 220 may have engaging surfaces 223 for engaging the pair of side walls 141 of the inner chamber 140 as shown in FIGS. 5-6 and 11-12. The part of the engaging surface 223 close to the body 110 may incline inward the inner chamber 140 so that a guiding portion 223*a* may be formed. The guiding portion 223*a* may facilitate the insertion of the protrusion 220 into the inner chamber 140.

Exemplarily, the protrusions 220 may be disposed in pair, and two protrusions 220 of each pair may be spaced apart along the transverse direction Y-Y. The space between them may serve as a ventilation channel to communicate with the heat dissipation through-hole 211 on the latch 200. Exemplarily, the protrusion 220 may extend from the latch body 210 along the longitudinal direction X-X toward the body 110. The protrusion 220 may extend vertically to the latch body 210 and therefore not block the passage of airflow. And the structure of the protrusion 220 may be relatively simple and easy to process and manufacture.

As described above, in order to accommodate the latch body 210, the transverse dimension (i.e. the thickness) of the upper parts of the pair of side walls 131 of the outer chamber 130 may be smaller. Under the influence of reflow soldering, the pair of side walls 131 of the outer chamber 130 may be prone to deform. In practice, both the pair of side walls 131 of the outer chamber and the pair of side walls 141 of the inner chamber may be less prone to deformation than the pair of side walls 131 of the outer chamber alone. And, since the pair of side walls 141 of the inner chamber is much closer to the inner side of the insulating housing 100, their two ends are respectively limited by the pair of side walls 131 of the outer chamber and the body 110, thus compared with the pair of side walls 131 of the outer chamber, the pair of side walls 141 of the inner chamber is less easy to deform. Accordingly, even if the upper parts 131*a* of the side walls 131 of the outer chamber 130 are deformed, the pair of side walls 141 of the inner chamber 140 can still limit the latch 200. In this way, the latch 200 is not prone to shaking and has higher stability, so that the electronic card 500 maintained on the insulating housing 100 has higher stability, and the mechanical and electrical properties of the card edge connector are stable.

Exemplarily, as shown in FIG. 6, a transverse dimension A of the side wall 131 of the outer chamber may be less than or equal to 0.8 mm. The transverse dimension A may be 0.8 mm, 0.7 mm or 0.6 mm, etc. With this configuration, the accommodating space of the outer chamber 130 may be increased without increasing the dimension of the card edge connector, to facilitate accommodation of the latch body 210 with greater dimensions, thereby increasing the holding ability for the electronic card 500.

Exemplarily, a longitudinal dimension B of the side wall 131 of the outer chamber may be greater than or equal to 2.5 mm. The longitudinal dimension B may be 2.5 mm, 2.6 mm or 2.7 mm, etc. With this configuration, the accommodating space of the outer chamber 130 may be increased without increasing the dimension of the card edge connector, to facilitate accommodation of the latch body 210 with greater dimensions, thereby increasing the holding ability for the electronic card 500. Even if the side wall 131 of the outer chamber is deformed in the process of reflow soldering due to the larger longitudinal dimension B of the side wall 131 of the outer chamber, the protrusion 220 can be limited by the side walls 141 of the inner chamber to prevent the latch 200 from shaking along the transverse direction Y-Y to accordingly prevent the electronic card 500 from unexpected shaking.

The slot 150 may extend from the body 110 along the longitudinal direction X-X to the tower 120. The bottom of the electronic card 500 may be inserted into the slot 150, and the golden fingers on the electronic card 500 may be electrically connected with the contact tails 410 of the conductors 400 on the insulating housing 100. The inner chamber 140 may be coupled to the outer chamber 130 and the slot 150, which may facilitate the flow of the airflow along the longitudinal direction X-X and therefore ensure the ventilation effect.

Exemplarily, as shown in FIG. 6, the slot 150 may include a pair of side walls 151 spaced apart along the transverse direction Y-Y. The protrusion 220 may protrude into the slot along the transverse direction Y-Y. In this way, when the electronic card 500 is inserted into the slot 150, the electronic card 500 may squeeze outward the protrusion 220, as shown by the arrows in the figure. Accordingly, the protrusion 220 can be more tightly fitted to the side walls 141 of the inner chamber, thereby ensuring that the latch 200 is not prone to shaking and has higher stability. In additional, it can also help to fix the electronic card 500. The protrusion 220 may protrude relative to either or both of side walls 151 of the slot 150. Where there is a plurality of protrusions 220 disposed on both sides of the slot 150 respectively, these protrusions 220 may protrude relative to the side wall 151 of the slot 150 at their respective sides. One of such embodiments will be described in more details later. Where there is one protrusion 220, a recessed groove may be provided thereon. The recessed groove may face the slot 150, and the side wall of one or both sides of the recessed groove may protrude relative to the corresponding side wall 151 of the slot.

Exemplarily, the protrusion 220 may include a first protrusion 221 and a second protrusion 222. The first protrusion 221 and the second protrusion 222 may respectively engage the pair of side walls 141 of the inner chamber 140 when the latch 200 is in the locked position. The first protrusion 221 and the second protrusion 222 may be the same or different. With the first protrusion 221 and the second protrusion 222, the latch 200 engages the insulating housing 100 with higher intensity, thereby ensuring that the latch 200 is not prone to shaking and has higher stability. Exemplarily, each of the first protrusion 221 and the second protrusion 222 has a thickness L greater than or equal to 1.2 mm. The thickness L may be for example 1.2 mm, 1.3 mm, 1.4 mm, 1.5 mm, 1.6 mm, 1.7 mm, 1.8 mm, 1.9 mm or 2.0 mm, etc. The thickness L is a transverse dimension of each of the first protrusion 221 and the second protrusion 222. The increase of the thickness L of each of the first protrusion 221 and the second protrusion 222 may avoid the deformation caused by reflow soldering, thereby ensuring that the latch 200 is not prone to shaking and has higher stability. Preferably, the thickness L of each of the first protrusion 221 and the second protrusion 222 may be less than or equal to 2.0 mm. The excessive dimension of the thickness L of each of the first protrusion 221 and second protrusion 222 may result in occupying too much space in the inner chamber 140, which affects internal ventilation effect.

Exemplarily, the first protrusion 221 and the second protrusion 222 may be spaced apart along the transverse direction Y-Y. The first protrusion 221 and the second protrusion 222 may respectively be disposed at both sides of the slot 150 along the transverse direction Y-Y. In this way, the slot 150 can have better ventilation effect. And then the electronic card 500 has better heat dissipation, thus it can prevent the electronic card 500 from being damaged due to overheating.

Exemplarily, the distance between the first protrusion 221 and the second protrusion 222 may be less than the transverse width of the slot 150. When the latch 200 is in the locked position, the first protrusion 221 and the second protrusion 222 may hold the electronic card 500. In this way, when the electronic card 500 is inserted into the slot 150, the electronic card 500 may squeeze outward the first protrusion 221 and the second protrusion 222 as shown by the arrows in FIG. 6. Thus, the first protrusion 221 and the second protrusion 222 may be fitted more tightly to the side walls 141 of the inner chamber, thereby ensuring that the latch 200 is not prone to shaking and has higher stability.

In the case that the heat dissipation through-hole 211 extending along the longitudinal direction X-X is disposed on the latch body 210, the heat dissipation through-hole 211 may be coupled to the slot 150. The first protrusion 221 and the second protrusion 222 may respectively be disposed at both sides of the heat dissipation through-hole 211. The number of the heat dissipation through-hole 211 may be one or more. The heat dissipation through-hole 211 can facilitate heat dissipation of the electronic card 500, thereby preventing the electronic card 500 from being damaged due to overheating.

Figure 14:
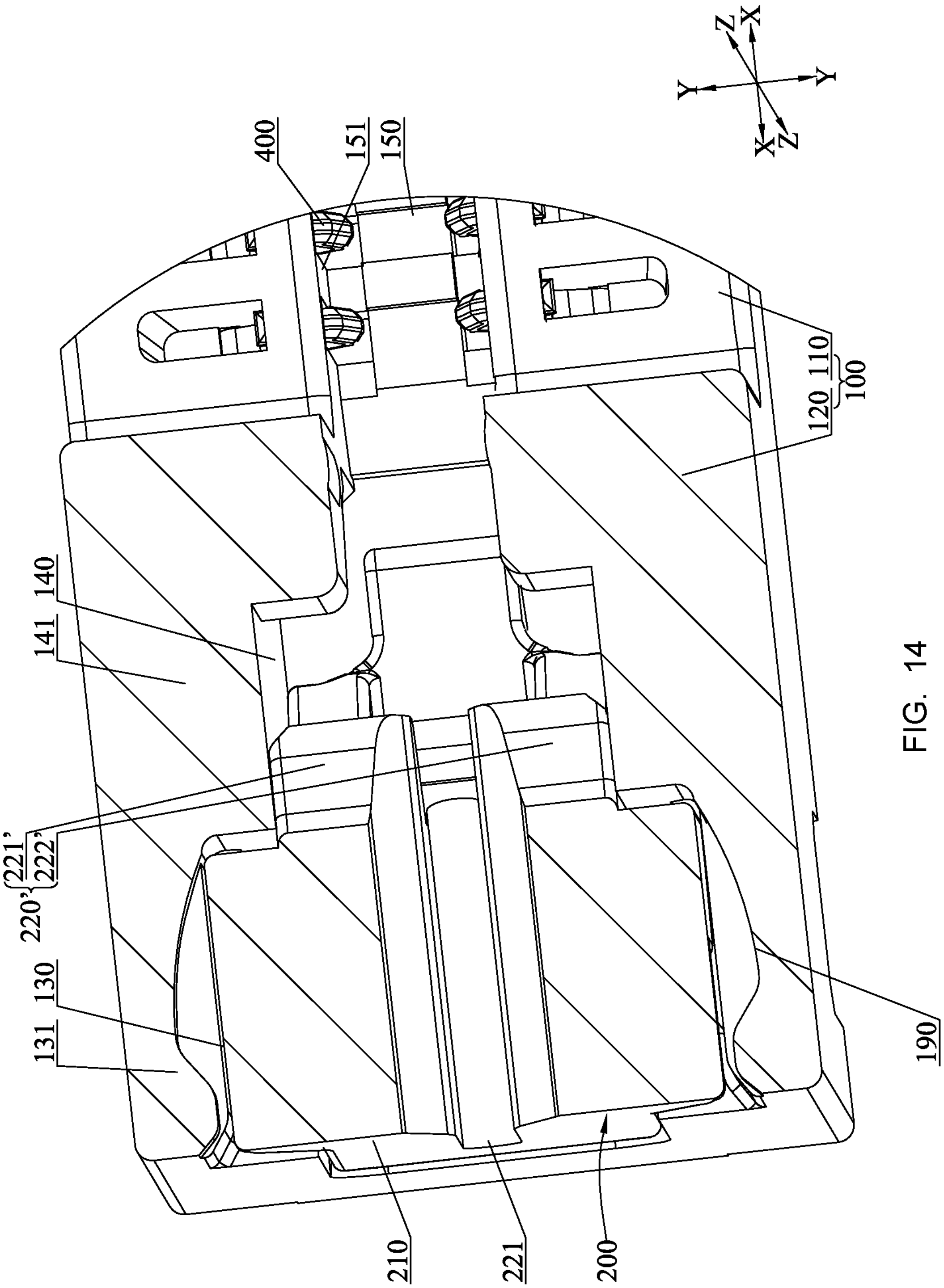
FIG. 14 is a partial sectional view of the card edge connector shown in FIG. 13 taken by a plane perpendicular to the vertical direction.
Figure 15:
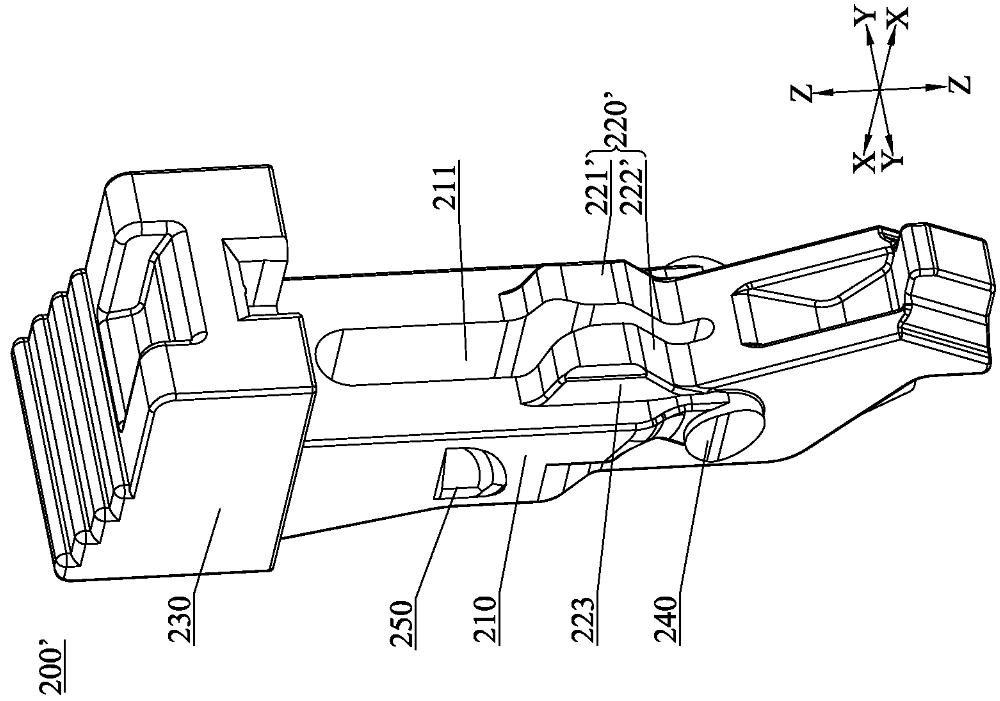
FIG. 15 is a perspective view of the latch shown in FIG. 13 from one perspective.
Figure 16:
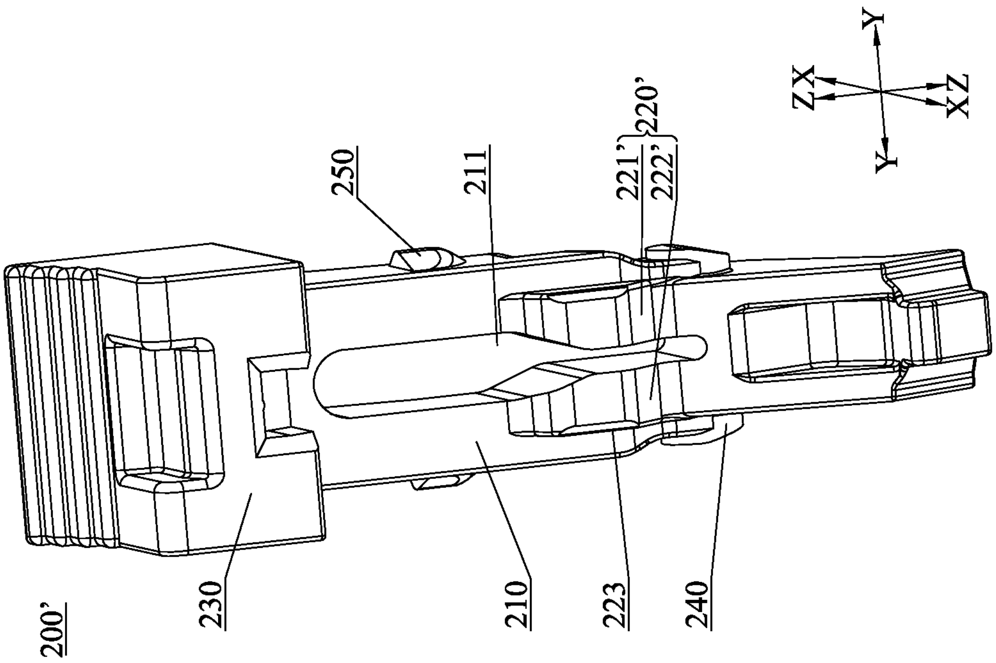
FIG. 16 is a perspective view of the latch shown in FIG. 13 from another perspective.

In other embodiments, the protrusions may also be spaced apart from the slot 150 along the transverse direction Y-Y. In this case, the protrusions may occupy a part of the inner chamber 140 along the transverse direction Y-Y. When the electronic card 500 is inserted into the slot 150, the protrusions may not make contact with the electronic card 500. Exemplarily, as shown in FIGS. 13-16, a first protrusion 221' and a second protrusion 222' of a latch 200' may be spaced apart from the slot 150 when the latch 200' is in the locked position. There thus may be no effect on the electronic card 500 for its being inserted in and pulled out, and the length of the protrusion 220' protruding from the latch body 210 is shorter, which may facilitate the processing. In this case, the opposite inner sides of the first protrusion 221' and the second protrusion 222' may be adaptive to the outline of the heat dissipation through-hole 211. That is, the opposite inner sides of the first protrusion 221' and the second protrusion 222' extend from the edge of the heat dissipation through-hole 211 toward the slot 150. The distance between the opposite inner sides of the first protrusion 221' and the second protrusion 222' is substantially equal to the width of the heat dissipation through-hole 211. As shown in FIG. 14, the side walls of the heat dissipation through-hole 211, opposite from each other along the transverse direction Y-Y, respectively are located in the same plane as the inner sides of the first protrusion 221' and the second protrusion 222' on their respective sides. The thickness of each of the first protrusion 221' and the second protrusion 222' may be greater, thereby suppressing the deformation caused by reflow soldering, and accordingly ensuring that the latch 200' is not prone to shaking and has higher stability.

In order to facilitate illustration of the principle of the card edge connector, as for the embodiments as shown in FIGS. 13-16, the components therein which are the same as or similar to those of the aforesaid embodiments are indicated with the same drawing signs. And for the sake of concision, no detailed descriptions of these same or similar components will be made in the text.

Exemplarily, as shown in FIG. 7, the tower 120 may have a portion 160 joining the pair of side walls 141 of the inner chamber 140. Along the vertical direction Z-Z, the protrusion 220 may engage the pair of side walls 141 of the inner chamber 140 between the portion 160 and the body 110. The mechanical strength of the tower 120 can be enhanced by the portion 160, thereby preventing the tower 120 from bending or even damage.

Figure 17:
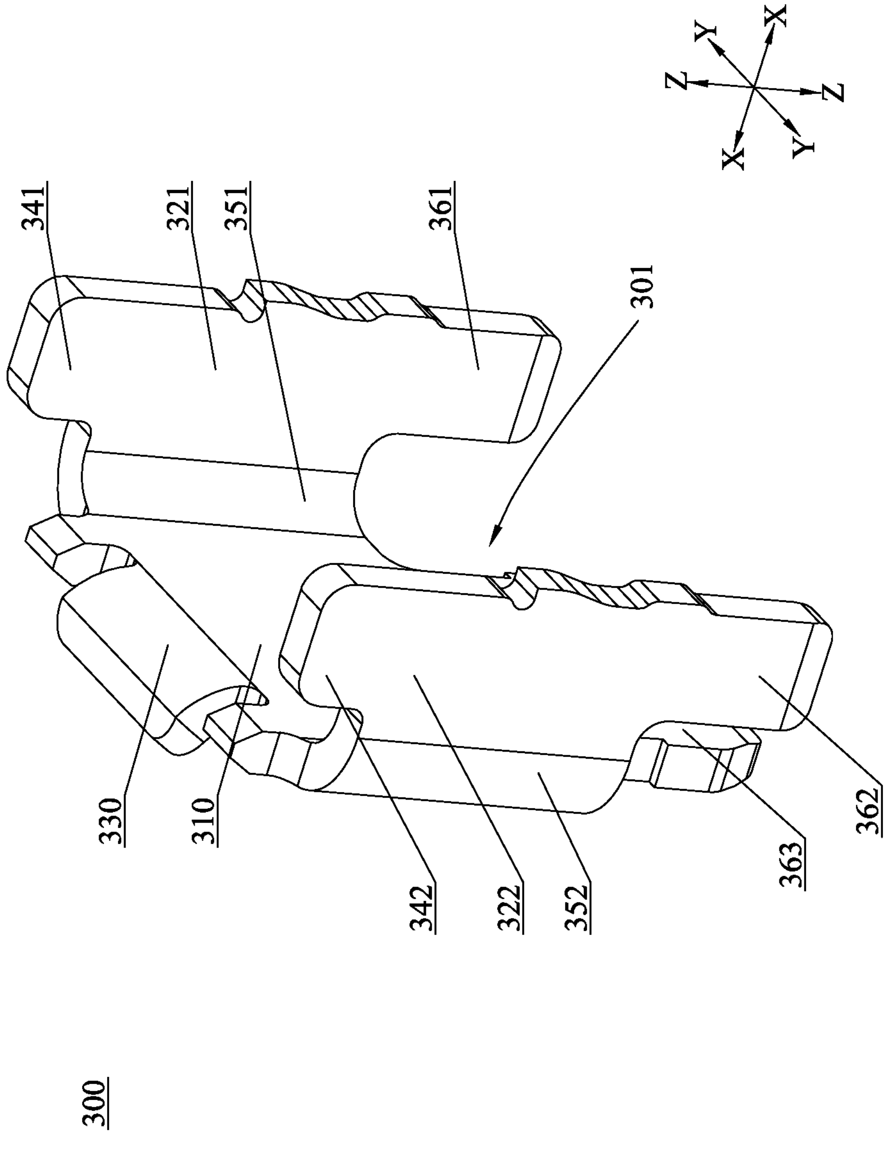
FIG. 17 is a perspective view of a reinforcing member according to an exemplary embodiment of the present disclosure.

Exemplarily, as shown in FIG. 17, a reinforcing member 300 may be disposed in the portion 160. The reinforcing member 300 may at least partially encircle an end along the longitudinal direction X-X of the slot 150. Optionally, the reinforcing member 300 mentioned above may be disposed in only one tower 120; or the reinforcing members 300 may be disposed in the two towers 120. Optionally, the reinforcing members 300 are disposed in both the two towers 120, and the two reinforcing members 300 respectively at least partially encircle the both ends along the longitudinal direction X-X of the slot 150.

The reinforcing member 300 may be made of the materials with greater strength such as plastics, ceramic, metal, etc. Preferably, the reinforcing member 300 is made of metallic materials. The metallic materials have greater strength, and the materials and the processing are less expensive. Preferably, the reinforcing member 300 is a sheet metal piece. In this way, the reinforcing member 300 has higher strength, simpler processing technic and lower cost.

By disposing the reinforcing member 300 within the portion 160, the portion 160 can be strengthened to enhance the impact resistance of the tower 120. In particular, in the card edge connector, the longitudinal dimension of the entire tower 120 is significantly greater than the transverse dimension, and when the tower 120 suffers from an impact force along the transverse direction Y-Y, it is prone to deformation or cracking. When the electronic card 500 is inserted into the slot 150, the reinforcing member 300 may maintain the shape of the tower 120 from both sides of the electronic card 500 along the transverse direction Y-Y. The tower 120 can be prevented from deformation or cracking when the electronic card 500 is impacted by an external force.

Exemplarily, a section of the reinforcing member 300 parallel to the longitudinal direction X-X and the transverse direction Y-Y may be presented as a U-shape. The section is formed by cutting the reinforcing member 300 by a plane perpendicular to the vertical direction Z-Z. An opening 301 of the U-shape may face the slot 150. The end of the slot 150 may extend into the opening 301 of the U-shape. Along the transverse direction Y-Y, both ends of the U-shaped opening 301 are respectively disposed on both sides of the slot 150. Thus, the structure of the reinforcing member 300 is simple, and the mechanical strength of the slot 150 can be enhanced to prevent the slot 150 from deformation or cracking.

Exemplarily, when the latch 200 is in the locked position, the reinforcing member 300 and the protrusion 220 may be disposed sequentially along the vertical direction Z-Z. Since the vertical dimension of the tower 120 is greater, this configuration may sufficiently use the vertical dimension of the tower 120, thereby increasing the space utilization of the card edge connector to achieve miniaturization. And, the reinforcing member 300 and the protrusion 220 may effectively share the impact force on the tower 120 along the transverse direction Y-Y, thereby improving the resistibility of the tower 120 to the impact force along the transverse direction Y-Y, and accordingly protecting the insulating housing 100 from deformation or cracking.

Exemplarily, a groove 170 may be provided in the portion 160. The reinforcing member 300 may be inserted into the groove 170. The reinforcing member 300 may be inserted into the groove 170 along any appropriate direction, for example the longitudinal direction X-X (not shown) or the vertical direction Z-Z (as shown in the figures). The groove 170 may have different shapes and structures depend on the direction along which the reinforcing member 300 is mounted into the portion 160. If the reinforcing member 300 is inserted into the groove 170 along the longitudinal direction X-X, the groove 170, along the longitudinal direction X-X, may extend to the outer side surface of the portion 160. In this way, the reinforcing member 300 may be inserted into the groove 170 from this outer side surface. If the reinforcing member 300 is inserted into the groove 170 along the vertical direction Z-Z, the groove 170, along the vertical direction Z-Z, may extend to the top surface or bottom surface of the portion 160. Where the reinforcing member 300 can be inserted into the groove 170, the insulating housing 100 and the reinforcing member 300 may be manufactured separately and then assembled, thereby facilitating the manufacture and installation and reducing the cost of the card edge connector.

Optionally, the reinforcing member 300 may be mounted in the portion 160 not by insertion, but by sealing the reinforcing member 300 in the portion 160 when the insulating housing 100 is molded. However, this means may cause a higher cost of mold-opening for the insulating housing 100.

Further, the groove 170 may extend to the top surface of the portion 160. The reinforcing member 300 is inserted into the groove 170 from the top surface. Since the top surface of the portion 160 is the side where the electronic card 500 is inserted into the slot 150, the side has a greater view and operating space, so that it is more convenient for inserting the reinforcing member 300 from the top surface into the groove 170, thereby allowing better usage experience. And, from the top surface, it is able to check whether the reinforcing member 300 is properly inserted into the groove 170.

Preferably, as shown in FIG. 8, the bottom of the groove 170 may have a first step 171 and a second step 172. The first step 171 and the second step 172 may be spaced apart along the transverse direction Y-Y. A first recess 173 and a second recess 174 may be formed on both sides of the first step 171 and the second step 172, respectively. A third recess 175 may be formed between the first step 171 and the second step 172. The first recess 173, the second recess 174 and the third recess 175 may or may not pass through to the bottom surface of the portion 160. The first recess 173 and the second recess 174 may be disposed on both sides of the groove 170 along the transverse direction Y-Y. The lower part of the reinforcing member 300 is adaptive to the bottom of the groove 170. Correspondingly, as shown in FIG. 17, a first positioning protrusion 361, a second positioning protrusion 362 and a third positioning protrusion 363 may be provided on the lower part of the reinforcing member 300. The first positioning protrusion 361, the second positioning protrusion 362 and the third positioning protrusion 363 may be inserted into the first recess 173, the second recess 174 and the third recess 175, respectively. The first step 171 and the second step 172 may be the same or different. The first recess 173 and the second recess 174 may be the same or different. The dimension of the reinforcing member 300 along the vertical direction Z-Z can be extended as far as possible with the first recess 173, the second recess 174 and the third recess 175, to protect the tower 120 from deformation or cracking.

Further, the third recess 175 may be deeper than the first recess 173 and the second recess 174. In this way, the insertion depth of the main part of the reinforcing member 300 can be increased which is benefit for increasing the vertical height of the opening 301 to ensure the interference force of the reinforcing member 300 so as to protect the tower 120 from deformation or cracking.

Optionally, the depth of the third recess 175 may be less than or equal to that of the first recess 173 and the second recess 174.

Preferably, the reinforcing member 300 may include a transverse portion 310, a first longitudinal portion 321 and a second longitudinal portion 322. The transverse portion 310 may extend along the transverse direction Y-Y. The first longitudinal portion 321 and the second longitudinal portion 322 may extend along the longitudinal direction X-X from both ends of the transverse portion 310. The first longitudinal portion 321 and the second longitudinal portion 322 may be the same or different. The first longitudinal portion 321 and the second longitudinal portion 322 may be spaced apart to form the U-shaped opening 301. The first positioning protrusion 361, the second positioning protrusion 362 and the third positioning protrusion 363 mentioned above may be disposed on the transverse portion 310, the first longitudinal portion 321 and the second longitudinal portion 322, respectively. The reinforcing member 300 may also include an elastic portion 330. The elastic portion 330 may bend from the top part of the transverse portion 310 in a direction away from the slot 150. The radius of curvature of the elastic portion 330 may be arbitrary. The elastic portion 330 may abut against the groove 170. Exemplarily, the first longitudinal portion 321, the second longitudinal portion 322 and the elastic portion 330 may be assembled with the transverse portion 310 by the welding, bonding, etc., or these four portions may be formed in an integrated piece. The elastic portion 330 may play a guiding role to prevent the electronic card 500 from being scratched when the electronic card 500 is inserted into the slot 150 along the vertical direction Z-Z, so that the electronic card 500 can be effectively inserted into the slot 150.

Optionally, the reinforcing member 300 may also include a first extension portion 341 and a second extension portion 342. The first extension portion 341 and the second extension portion 342 may extend upward from the first longitudinal portion 321 and the second longitudinal portion 322, respectively. The first extension portion 341 and the second extension portion 342 may be the same or different. Exemplarily, the first extension portion 341 and the first longitudinal portion 321, the second extension portion 342 and the second longitudinal portion 322 may be separately assembled by the welding, bonding, etc. or may be formed in an integrated piece separately. The first extension portion 341 and the second extension portion 342 may increase the vertical dimension of the reinforcing member 300 as much as possible to enhance the resistibility of the reinforcing member 300 to the impact force. Thus, the tower 120 can be better protected from deformation or cracking.

Optionally, as shown in FIG. 17, the transverse portion 310 and the first longitudinal portion 321 may be connected through a first arc transition portion 351. The transverse portion 310 and the second longitudinal portion 322 may be connected through a second arc transition portion 352. The radius of curvature of the first arc transition portion 351 and the second arc transition portion 352 may be arbitrary. In this way, the reinforcing member 300 is easier to be formed with a single piece of plate, and the production cost thereof is lower.

The latch 200 in FIG. 3 is in the locked position, and the reinforcing member 300 is wrapped within the corresponding latch 200 and tower 120. Thus, it can be ensured that the reinforcing member 300 is not contaminated by external dust and other dirt, to avoid problems such as oxidation of the reinforcing member 300. The structural strength of the reinforcing member 300 can be ensured so as to better protect the tower 120.

The present disclosure has been described by the above embodiments, but it should be understood that a variety of variations, modifications and improvements may be made according to the teaching of the present disclosure by those skilled in the art, and all of these variations, modifications and improvements fall within the spirit and the scope of protection of the present disclosure. The scope of protection of the present disclosure is defined by the appended claims and its equivalent scope. The above embodiments are only for the purpose of illustration and description, and are not intended to limit the present disclosure to the scope of the described embodiments.

In the description of the present disclosure, it is to be understood that orientation or positional relationships indicated by orientation words "front", "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be. As illustrated located, and structured and operated in a specific direction, and therefore, should not be understood as limitations to the present disclosure. The orientation words "inside" and "outside" may refer to the inside and outside relative to the contour of each component itself.

Various variations may be made to the structures illustrated and described herein. For example, the card edge connector described above can be any suitable connector, such as backplane connectors, daughter card connectors, stacking connectors, Mezzanine connectors, I/O connectors, chip sockets, Gen Z connectors, etc.

As illustrated, although many creative aspects have been described above with reference to vertical connectors, it should be understood that the aspects of the present disclosure are not limited to these. Any one of the creative features, whether alone or combined with one or more other creative features, can also be used for other types of electrical connectors, such as coplanar connectors, etc.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. A card edge connector comprising:

a housing comprising a body and a tower connected to an end of the body in a longitudinal direction of the body, the tower comprising an outer chamber and an inner chamber joining the outer chamber and the end of the body; and a latch pivotably connected to the tower so as to pivot between a locked position and an unlocked position, the latch comprising a latch body and a protrusion extending from the latch body, wherein:

when the latch is in the locked position, the latch body is at least partially disposed in the outer chamber;

the protrusion is configured to engage a side wall of the inner chamber so that the side wall limits the latch along a transverse direction perpendicular to the longitudinal direction;

the outer chamber comprises a side wall joining the side wall of the inner chamber; and a transverse dimension of the side wall of the inner chamber is greater than a transverse dimension of the side wall of the outer chamber.

2. The card edge connector of claim 1, wherein, when the latch is in the locked position:

the latch body is adjacent the side wall of the outer chamber; and the protrusion contacts the side wall of the inner chamber.

3. The card edge connector of claim 1, wherein:

the transverse dimension of the side wall of the outer chamber is in the range of 0.6 mm to 0.8 mm; and/or a longitudinal dimension of the side wall of the outer chamber is in the range of 2.5 mm to 2.7 mm.

4. The card edge connector of claim 1, wherein:

the protrusion comprises a surface engaging the side wall of the inner chamber; and the surface of the protrusion comprises a guiding portion inclining toward an interior of the inner chamber.

5. The card edge connector of claim 1, wherein:

the housing comprises a slot extending from the body to the tower; and the inner chamber connects the outer chamber and the slot.

6. The card edge connector of claim 5, wherein:

the protrusion is configured to protrude into the slot when the latch is pivoted into the locked position.

7. The card edge connector of claim 5, wherein:

the protrusion is a first protrusion;

the latch comprises a second protrusion extending from the latch body; and the first protrusion and the second protrusion engage respective side walls of the inner chamber when the latch is in the locked position.

8. The card edge connector of claim 7, wherein:

the tower comprises a portion connecting a pair of side walls of the inner chamber; and the card edge connector comprises a reinforcing member disposed in the portion of the tower and at least partially encircling an end of the slot.

9. The card edge connector of claim 7, wherein:

the first protrusion and the second protrusion are disposed on opposite sides of the slot along the transverse direction.

10. The card edge connector of claim 9, wherein:

the first protrusion and the second protrusion are separated from each other by a distance in the transverse direction; and the distance is less than a transverse width of the slot.

11. The card edge connector of claim 7, wherein:

the latch body comprises a heat dissipation through-hole coupled to the slot; and the first protrusion and the second protrusion are disposed on opposite sides of the heat dissipation through-hole.

12. The card edge connector of claim 11, wherein:

the first protrusion and the second protrusion comprise respective inner sides facing each other; and the respective inner sides of the first protrusion and the second protrusion are disposed on opposite sides of the heat dissipation through-hole.

13. A latch for a card edge connector, the latch comprising:

a body elongated in a vertical direction;

a heat dissipation through-hole through the body; and a pair of protrusions extending from the body, each of the pair of protrusions elongated in the vertical direction and protruding in a longitudinal direction perpendicular to the vertical direction, wherein:

the pair of protrusions are spaced from each other in a transverse direction perpendicular to both the vertical direction and the longitudinal direction and disposed on opposite sides of the heat dissipation through-hole.

14. The latch of claim 13, wherein:

each of the pair of protrusions has a transverse dimension in the range of 1.2 mm to 2.0 mm.

15. The latch of claim 13, wherein:

the pair of protrusions are separated from each other by a distance in the transverse direction less than a transverse width of a slot of a housing to which the latch is disposed.

16. The latch of claim 13, comprising:

a pair of bulges extending from the body, each of the pair of bulges protruding outward from the body in the transverse direction.

17. The latch of claim 16, comprising:

a pair of hubs extending from the body and configured to pivotably engage a housing of the card edge connector; and an operating portion disposed at a distal end of the latch and configured to receive forces that pivot the latch.

18. An electronic system comprising:

an electrical connector comprising:

a housing comprising a tower disposed at an end of the housing and a slot elongated along the housing, the tower comprising an outer chamber and an inner chamber joining the outer chamber and slot, the outer chamber and the inner chamber comprising joined side walls, the side walls of the inner chamber being thicker than the side walls of the outer chamber; and a latch disposed in the tower, the latch comprising:

a latch body engaging the side walls of the outer chamber, and a pair of protrusions extending from the latch body and engaging the side walls of the inner chamber; and an electronic card disposed in the slot of the housing.

19. The electronic system of claim 18, wherein:

the outer chamber comprises a side wall joining the side wall of the inner chamber; and a transverse dimension of the side wall of the inner chamber is greater than a transverse dimension of the side wall of the outer chamber.

20. The electronic system of claim 18, wherein:

the pair of protrusions fit snugly between the electronic card and the side walls of the inner chamber.

* * * * *